United States Patent
Berbee et al.

(10) Patent No.: US 10,774,159 B2
(45) Date of Patent: Sep. 15, 2020

(54) HIGH PRESSURE, FREE RADICAL POLYMERIZATIONS TO PRODUCE ETHYLENE-BASED POLYMERS

(71) Applicant: Dow Global Technologies LLC, Midland, MI (US)

(72) Inventors: Otto J. Berbee, Terneuzen (NL); Nhi T. Y. Dang, Terneuzen (NL); Cornelis J F Hosman, Terneuzen (NL); Joaquin Flores, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 111 days.

(21) Appl. No.: 16/302,830

(22) PCT Filed: Jun. 22, 2017

(86) PCT No.: PCT/US2017/038777
§ 371 (c)(1),
(2) Date: Nov. 19, 2018

(87) PCT Pub. No.: WO2017/223329
PCT Pub. Date: Dec. 28, 2017

(65) Prior Publication Data
US 2019/0177443 A1   Jun. 13, 2019

(30) Foreign Application Priority Data
Jun. 24, 2016   (EP) .................................... 16382297

(51) Int. Cl.
*C08F 2/01*   (2006.01)
*C08F 2/00*   (2006.01)
(Continued)

(52) U.S. Cl.
CPC ................ *C08F 2/001* (2013.01); *C08F 2/00* (2013.01); *C08F 2/01* (2013.01); *C08F 2/38* (2013.01);
(Continued)

(58) Field of Classification Search
USPC .......................................................... 526/64
See application file for complete search history.

(56) References Cited

U.S. PATENT DOCUMENTS

| 4,014,859 A | 3/1977 | Cooper et al. |
| 4,135,044 A | 1/1979 | Beals |

(Continued)

FOREIGN PATENT DOCUMENTS

| DE | 276598 A3 | 3/1990 |
| GB | 1370101 A | 10/1974 |

(Continued)

OTHER PUBLICATIONS

Extended European Search Report pertaining to European Patent Application No. 16382297.6 dated Oct. 24, 2016.
(Continued)

*Primary Examiner* — Fred M Teskin
(74) *Attorney, Agent, or Firm* — Dinsmore & Shohl LLP

(57) ABSTRACT

A process to form an ethylene-based polymer comprising polymerizing a mixture comprising ethylene, in the presence of a free-radical initiator, and in a tubular reactor system comprising at least two ethylene-based feed streams, and a reactor configuration that comprises at least three reaction zones; and the inlet pressure of the first zone is <3200 Bar; and the ethylene conversion >28%, and an m value from 20 mole % to 70 mole %, where m=mol % of ethylene-based feed stream to the first zone, based on total moles of ethylene-based feed streams fed to the reactor configuration; and the ratio (Q) of a "MWDB of a broad polymer polym-
(Continued)

erized, to a "MWDN of a narrow polymer polymerized, is as follows: $\{(T)*(-2.3\times\log(m)+7)\}\leq Q\leq\{(T)*(-13.0\times\log(m)+29.8)\}$; at the same melt index; and "T" is the "chain transfer activity ratio" as described herein.

10 Claims, 5 Drawing Sheets

(51) Int. Cl.
*C08F 2/38* (2006.01)
*C08F 10/02* (2006.01)
*C08F 110/02* (2006.01)

(52) U.S. Cl.
CPC ............ *C08F 10/02* (2013.01); *C08F 110/02* (2013.01); *C08F 2400/02* (2013.01); *C08F 2500/03* (2013.01); *C08F 2500/04* (2013.01); *C08F 2500/08* (2013.01); *C08F 2500/12* (2013.01); *Y02P 20/582* (2015.11)

(56) References Cited

U.S. PATENT DOCUMENTS

| | | | |
|---|---|---|---|
| 6,569,962 | B1 | 5/2003 | Zschoch et al. |
| 6,596,241 | B2 | 7/2003 | Donck |
| 7,509,891 | B2 | 3/2009 | Miyake et al. |
| 7,582,709 | B2 | 9/2009 | Goossens et al. |
| 7,745,550 | B2 | 6/2010 | Donck et al. |
| 7,820,776 | B2 | 10/2010 | Neuteboom et al. |
| 8,415,442 | B2 | 4/2013 | Karjala et al. |
| 8,445,606 | B2 | 5/2013 | Lammens et al. |
| 8,859,704 | B2 | 10/2014 | Karjala et al. |
| 8,871,876 | B2 | 10/2014 | Berbee et al. |
| 9,120,880 | B2 | 9/2015 | Zschoch et al. |
| 9,228,036 | B2 | 1/2016 | Berbee et al. |
| 9,334,348 | B2 | 5/2016 | Berbee et al. |
| 9,394,389 | B2 | 7/2016 | Berbee et al. |
| 2003/0114607 | A1 | 6/2003 | Donck |
| 2004/0181015 | A1* | 9/2004 | Deckers ................ C08F 10/02 526/64 |
| 2013/0333832 | A1 | 12/2013 | Vittorias et al. |
| 2016/0137822 | A1 | 5/2016 | den Doelder et al. |
| 2016/0297904 | A1 | 10/2016 | Berbee et al. |
| 2016/0304638 | A1 | 10/2016 | Den Doelder et al. |

FOREIGN PATENT DOCUMENTS

| | | |
|---|---|---|
| JP | 05053442 B2 | 7/2012 |
| WO | 0001740 A2 | 1/2000 |
| WO | 0168723 A2 | 9/2001 |
| WO | 0214379 A1 | 2/2002 |
| WO | 2006094723 A1 | 9/2006 |
| WO | 2012044504 A1 | 4/2012 |
| WO | 2012117039 A1 | 9/2012 |
| WO | 2013059042 A1 | 4/2013 |
| WO | 2014190036 A1 | 11/2014 |
| WO | 2016210075 A1 | 12/2016 |
| WO | 2016210235 A1 | 12/2016 |
| WO | 2016209706 A3 | 1/2017 |

OTHER PUBLICATIONS

International Search Report and Written Opinion pertaining to PCT/US2017/038777 dated Aug. 25, 2017.
Goto et al., "Computer Model for Commercial High-Pressure Polyethylene Reactor Based on Elementary Reaction Rates Obtained Experimentally", J. Applied Polymer Science, 36, 21-40, 1981.
Luft, Gerhard, Chem.-Ing.-Tech., Hochdruck-Polyaethylen, vol. 51 (1979) Nr. 10, pp. 960-969.
Ehrlich et al., "Fundamentals of the free radical polymerization of ethylene", Adv. Polymer Sci., vol. 7, 386-448 (1970).
Mortimer, G., "Chain transfer in ethylene polymerization", Journal of Polymer Science: Part A-1, vol. 4, p. 881-900 (1966).
Mortimer, G., "Chain transfer in ethylene polymerization. IV. Additional study at 1360 atm and 130° C", Journal of Polymer Science: Part A-1, ; vol. 8, p. 1513-1523 (1970).
Mortimer, G., "Chain transfer in ethylene polymerization. Part V. The effect of temperature", Journal of Polymer Science: Part A-1, ; vol. 8, p. 1535-1542 (1970).
Mortimer, G., "Chain transfer in ethylene polymerization VII. Very reactive and depletable transfer agents", Journal of Polymer Science: Part A-1, , vol. 10, p. 163-168 (1972).
Yamamoto et al., "Rate Constant for Long-Chain Branch Formation in Free-Radical Polymerization of Ethylene", J. Macromol. Science-Chem. 1979, 1067.

* cited by examiner

HIGH PRESSURE, FREE RADICAL POLYMERIZATIONS TO PRODUCE ETHYLENE-BASED POLYMERS

REFERENCE TO RELATED APPLICATIONS

This application claims priority to European Patent Application No. 16382297.6, filed Jun. 24, 2016.

BACKGROUND OF INVENTION

Low Density Poly Ethylene (LDPE) is produced in an autoclave and/or tubular reactor at high pressure and temperature. High pressure, free-radical polymerizations are disclosed in the following references: U.S. Pat. Nos. 8,445,606, 4,135,044, 7,582,709, and JP050534422 (Abstract). The tubular process is preferred over the autoclave process by its capability to increase ethylene conversion. It would be desirable to combine the higher ethylene conversion potential of a tubular process with maximum flexibility in product design as function of Molecular Weight Distribution (MWD) and rheological properties, such as melt-index and melt strength (MS). MWD and MS are influenced by the process conditions, such as reactor type, pressure and temperature conditions and monomer ethylene conversion, while the product melt-index is controlled with the level of chain transfer agent (CTA). Typically, broad MWD resins are made using higher max. polymerization temps. in each reaction zone, while narrow MWD resins are made by using lower max. polymerization temps. in each zone, and thus, broad MWD resins are consequently made at higher monomer ethylene conversion and polymer output, while the narrow MWD resins are made at lower ethylene conversion and lower polymer output. Another important parameter is the polymer output of a high pressure polymerization process, which can range from 40 to 450 KTA or higher.

The polymer output of a tubular process is affected by ethylene conversion and monomer throughput. The ethylene conversion is governed by the desired product properties. The monomer throughput depends on the design and the operating conditions of a hyper compressor system, which compresses the monomer feed stream to the required reactor inlet pressure. Another parameter of importance is the energy required to produce a unit of polymer. This energy requirement is largely determined by the compression energy required by the hyper compressor. Thus, there is a need to maximize polymer production by increasing ethylene conversion for a given amount of compression energy. The maximization of polymer production needs to be combined with maximization of the flexibility in product design, as expressed as the ratio of broad MWD to narrow MWD capability at a given melt-index. The extension of product design, while maximizing polymer output and/or reducing energy input, have been met herein.

SUMMARY OF THE INVENTION

The invention provides, in a first aspect, a process to form an ethylene-based polymer, said process comprising polymerizing a mixture comprising ethylene, in the presence of at least one free-radical initiator, and in a tubular reactor system comprising at least two ethylene-based feed streams, and a reactor configuration that comprises at least three reaction zones; and wherein the inlet pressure of the first reaction zone is less than, or equal to, 3200 Bar; and the polymerization has an ethylene conversion ≥28%, and an m value from 20 mole % to 70 mole %, where m=mol % of ethylene-based feed stream to the first reaction zone, based on the total moles of ethylene-based feed streams fed to the reactor configuration; and wherein the ratio (Q) of a "$MWD_B$ of a broad polymer polymerized (polymer polymerized to a broad MWD), to a "$MWD_N$ of a narrow polymer polymerized (polymer polymerized to a narrow MWD), is as follows: $\{(T)*(-2.3 \times \log(m)+7)\} \leq Q \leq \{(T)*(-13.0 \times \log(m)+29.8)\}$; and wherein the "$MWD_B$ polymer" and the "$MWD_N$ polymer" both have the same melt index; and wherein the "T" is the "chain transfer activity ratio" and "T" is from 0.6 to 1.6, and T is defined as follows: $T=\{[0.1*\ln(Cs_{narrow\ MWD\ process}/Cs_{broad\ MWD\ process})]+1\}$; wherein $Cs_{narrow\ MWD\ process}$ and $Cs_{broad\ MWD\ process}$ are average Cs values of the CTA system at the outlet of the reactor configuration used to produce, respectively, the narrow and the broad MWD polymers, and wherein $MWD_B > MWD_N$. In a further embodiment, $MWD_B > 4.0\ MWD_N$, or $MWD_B > 4.5\ MWD_N$, or $MWD_B > 5.0 MWD_N$, or $MWD_B > 5.5 MWD_N$, or $MWD_B > 6.0 MWD_N$.

In a second aspect, the invention provides a process to form an ethylene-based polymer, said process comprising polymerizing a mixture comprising ethylene, in the presence of at least one free-radical initiator, and in a tubular reactor system comprising at least two ethylene-based feed streams, and a reactor configuration that comprises at least three reaction zones; and wherein the inlet pressure of the first reaction zone is less than, or equal to, 3200 Bar; and the polymerization has an ethylene conversion ≥28%, and an m value from 20 mole % to 70 mole %, where m=mol % of ethylene-based feed stream to the first reaction zone, based on the total moles of ethylene-based feed streams fed to the reactor configuration; and wherein the ratio (W) of a "$MWD_B$ of a polymer" polymerized to a broad MWD," to the "$MWD_N$ of a polymer polymerized to a narrow MWD", is as follows:

$$\{[(T) \times (-1.1 \times \log(m) + 3.0)] * [(1 - 0.115 * \frac{P_B - P_N}{400\ \text{Bar}})]\} \leq$$

$$W \leq \{[(T)*(-6.2*\log(m) + 13.5)] * [(1 - 0.115 * \frac{P_B - P_N}{400\ \text{Bar}})]\};$$

where $P_B$ is the inlet pressure for the "$MWD_B$ polymer;" $P_N$ is the inlet pressure for the "$MWD_N$ polymer;" and wherein the "$MWD_B$ polymer" and the "$MWD_N$ polymer" both have the same melt index; and wherein "T" is the "chain transfer activity ratio," $T=\{[0.1*\ln(Cs_{narrow\ MWD\ process}/Cs_{broad\ MWD\ process})]+1\}$, and "T" is from 0.4 to 1.6; $MWD_B > MWD_N$; and wherein $Cs_{narrow\ MWD\ process}$ and $Cs_{broad\ MWD\ process}$ are average Cs value of the CTA system at the outlet of the reactor configuration used to produce, respectively, the narrow and the broad MWD polymers, and wherein $MWD_B > MWD_N$; and wherein the ethylene conversion of the polymerization for the broad MWD polymer is equal to the ethylene conversion of the polymerization for the narrow MWD polymer.

In a third aspect, the invention provides a process to form an ethylene-based polymer, said process comprising polymerizing a mixture comprising ethylene, in the presence of at least one free-radical initiator, and in a tubular reactor system comprising at least two ethylene-based feed streams, and a reactor configuration that comprises at least three reaction zones; and wherein the inlet pressure of the first reaction zone is less than, or equal to, 3200 Bar; and the polymerization has an ethylene conversion ≥28%, and an m value from 20 mole % to 70 mole %, where m=mol % of ethylene-based feed stream to the first reaction zone, based on the total moles of ethylene-based feed streams fed to the reactor; and wherein the ratio (Y) of a "$MWD_B$ of a polymer polymerized to a broad MWD" to a "$MWD_N$ of a polymer" polymerized to a narrow MWD", is as follows: $\{(T)\times(-1.1\times \log(m)+3.0)\}\leq Y \leq \{(T)\times(-6.2\times\log(m)+13.5)\}$; and wherein the "$MWD_B$ polymer" and the "$MWD_N$ polymer" both have the same melt index (I2); and wherein "T" is the "chain transfer activity ratio" and $T=\{[0.1*\ln(Cs_{narrow\ MWD\ process}/Cs_{broad\ MWD\ process})]+1\}$, and "T" is from 0.4 to 1.6; and wherein $Cs_{narrow\ MWD\ process}$ and $Cs_{broad\ MWD\ process}$ are average Cs value of the CTA system at the outlet of the reactor configuration used to produce, respectively, the narrow and the broad MWD polymers, and wherein $MWD_B>MWD_N$; and wherein the ethylene conversion of the polymerization for the broad MWD polymer is equal to the ethylene conversion of the polymerization for the narrow MWD polymer; and wherein the inlet pressure of the polymerization for the broad MWD polymer is equal to the inlet pressure of the polymerization for the narrow MWD polymer.

DESCRIPTION OF EMBODIMENTS OF THE INVENTION

Figure 1:
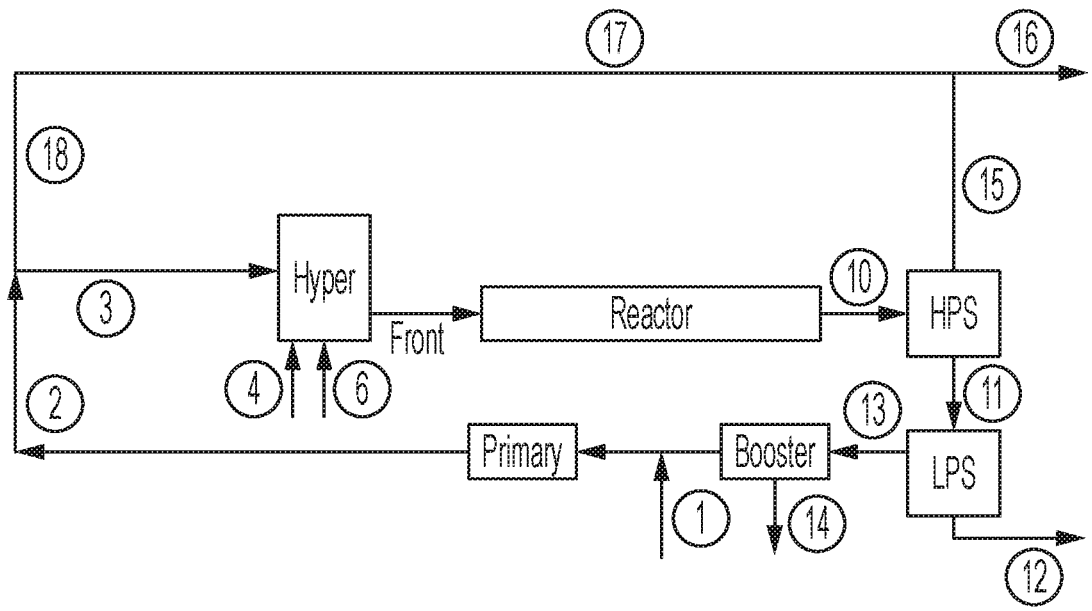
FIG. 1 is a process flow diagram containing a tubular reactor used for polymerizations PE1 to PE10.

New polymerization processes have been discovered that provide ethylene-based polymers with wide variation in molecular weight distributions, at reduced pressure levels with high polymer output. The broad and narrow MWD polymers can be produced at high polymer output, providing better economics. The invention increases the ratio of broad MWD to narrow MWD capability, by a polymerization, at constant, or varying, high ethylene conversion (for example, conversion ≥28%). Also, it has been discovered that make-up ethylene distributions and/or make-up CTA distributions can be used over the reactor feed stream(s), to further enhance product and process capabilities. An inventive process may comprise a combination of two or more embodiments described herein.

In one embodiment, with respect to the first aspect, the "chain transfer activity ratio" and "T" is from 0.5 to 1.5, or from 0.6 to 1.4. In one embodiment, for the first aspect, the $MWD_B>MWD_N+1.0$, or $MWD_B>MWD_N+2.0$, or $MWD_B>MWD_N+3.0$, or $MWD_B>MWD_N+4.0$ or $MWD_B>MWD_N+5.0$.

In one embodiment, with respect to the second aspect, the "chain transfer activity ratio" and "T" is from 0.5 to 1.5, or from 0.6 to 1.4. In one embodiment, for the second aspect, the $MWD_B>MWD_N+0.5$, or $MWD_B>MWD_N+1.0$, or $MWD_B>MWD_N+2.0$.

In one embodiment, with respect to the third aspect, the "chain transfer activity ratio" and "T" is from 0.5 to 1.5, or from 0.6 to 1.4. In one embodiment, for the third aspect, the $MWD_B>MWD_N+1.0$, or $MWD_B>MWD_N+2.0$, or $MWD_B>MWD_N+3.0$, or $MWD_B>MWD_N+4.0$, or $MWD_B>MWD_N+5.0$.

As used herein, for each aspect, the phrase "the same melt index (I2 or MI)" or similar phrases, are defined as an I2 difference within ±5.0%, where the I2 difference=$\{[(I2$ of broad$-I2$ of narrow)/average $I2]\times100\}$. As used herein, the phrase "equal or same ethylene conversion," or similar phrases, are defined as an ethylene conversion difference within ±1.0%, where the ethylene conversion difference=$\{[(ethylene conversion of broad$-$ethylene conversion of narrow)/average ethylene conversion]\times100\}$. As used herein, the phrase "equal or same inlet pressure," or similar phrases, are defined as an inlet pressure difference within ±1.0%, where the inlet pressure difference=$\{[(inlet pressure of broad$-$inlet pressure of narrow)/average inlet pressure]\times100\}$.

The following embodiments apply to each of the three inventive aspects above.

In one embodiment an ethylene-based feed stream fed to the first reaction zone (1) and to two or more subsequent reaction zones selected from the following: zone n and zone n+1, or zone n+2, where n>1. In a further embodiment, ≥2 of the following ratios are met:

a) for reaction zone n, the ratio, RFEn, of "mole fraction of make-up (fresh) ethylene b) fed to the first reaction zone (FE1)" to "mole fraction of make-up (fresh) ethylene fed to reaction zone n (FEn)" is (RFEn=FE1/FEn) is FE1/FEn is >1, or from >1 to 200, or from >1 to 100, or from >1 to 50, or from >1 to 20, or from >1 to 10, or from >1 to 5, or from >1 to 2;

c) for reaction zone n+1, the ratio, RFEn+1, of "mole fraction of make-up ethylene fed to the first reaction zone (FE1)" to "mole fraction of make-up ethylene fed to reaction n+1 (FEn+1)" is (RFEn+1=FE1/FEn+1) is >1; or from >1 to 200, or from >1 to 100, or from >1 to 50, or from >1 to 20, or from >1 to 10, or from >1 to 5, or from >1 to 2;

d) for reaction zone n+2, the ratio, RFEn+2, of "mole fraction of make-up ethylene fed to the first reaction zone (FE1)" to "mole fraction of make-up ethylene fed to reaction zone n+2 (FEn+2)" is (RFEn+2=FE1/FEn+2) is >1; or from 1 to 200, or from 1 to 100, or from 1 to 50, or from 1 to 20, or from 1 to 10, or from 1 to 5, or from 1 to 2; and wherein the "total amount of ethylene fed to the polymerization process" derives from at least one make-up ethylene-based feed stream and at least one recycled ethylene-based feed stream. In another embodiment, at least two of the following ratios are met:

a) for reaction zone n, the ratio, RFEn, of "mole fraction of make-up ethylene fed to the first reaction zone (FE1)" to "mole fraction of make-up ethylene fed to reaction zone n (FEn)" is (RFEn=FE1/FEn) is FE1/Fen, wherein 0≤RFEn<1, or RFEn is from 0 to 0.9, or from 0 to 0.8, or from 0 to 0.7, or from 0 to 0.5, or from 0 to 0.3;

b) for reaction zone n+1, the ratio, RFEn+1, of "mole fraction of make-up ethylene fed to the first reaction zone (FE1)" to "mole fraction of make-up ethylene fed to reaction zone n+1 (FEn+1)" is (RFEn+1=FE1/FEn+1) is <1, wherein 0≤RFEn+1<1; or RFEn+1 is from 0 to 0.9, or from 0 to 0.8, or from 0 to 0.7, or from 0 to 0.5, or from 0 to 0.3;

c) for reaction zone n+2, the ratio, RFEn+2, of "mole fraction of make-up ethylene fed to the first reaction zone (FE1)" to "mole fraction of make-up ethylene fed to reaction zone n+2 (FEn+2)" is (RFEn+2=FE1/FEn+2), wherein 0≤RFEn+2<1, or RFEn+2 is from 0 to 0.9, or from 0 to 0.8, or from 0 to 0.7, or from 0 to 0.5, or from 0 to 0.3; and wherein the "total amount of ethylene fed to the polymerization process" derives from at least one make-up ethylene-based feed stream and at least one recycled ethylene-based feed stream.

In one embodiment, the first ethylene-based feed stream comprises at least one CTA, and wherein the activity of the CTA system in the first ethylene-based feed stream is greater than, or equal to, the activity of the CTA system in each subsequent ethylene-based feed stream. In one embodiment, the first ethylene feed stream comprises at least one CTA, and wherein the activity of the CTA system in the first ethylene feed stream is less than the activity of the CTA system in each subsequent ethylene feed stream.

In one embodiment, the average of peak temperatures in the reaction zones is <320° C., or <319° C., or <318° C., or <317° C., or <316° C.

In one embodiment, the total ethylene based feed flow to the reactor configuration is from 30 to 400 tons per hr, or from 50 to 350 tons per hour.

In one embodiment, the reactor configuration comprises at least three ethylene-based feed streams. In one embodiment, the reactor configuration comprises only two ethylene-based feed streams. In one embodiment, the reactor configuration comprising at least four reaction zones and at least three ethylene feed streams.

In one embodiment, one or more CTAs is/are fed to the first reaction zone, in an amount from 20 mole % to 70 mole %, based on the total moles of ethylene, and optionally one or more comonomers and the one or more CTAs, fed to the polymerization.

In one embodiment, the reactor configuration comprises ≥4 ethylene feed streams. In one embodiment, the reactor configuration comprises only three ethylene feed streams.

In one embodiment, the combined amount of monomers and CTA(s) fed to the first reaction zone is from 20 to 40 mole % of the combined amount of monomers and CTA(s) fed to the polymerization. In one embodiment, the amount of ethylene, and optionally one or more comonomers, and optionally one or more CTAs, fed to the first reaction zone, is from 30 mole % to 75 mole %, or from 40 to 70 mole %, based on the total moles of ethylene, and optionally one or more comonomers, and optionally one or more CTAs, fed to the polymerization. In one embodiment, the combined amount of monomers and CTA(s) fed to the first reaction zone is from 20 to 60, or from 20 to 50, or from 20 to 45 mole %, of the combined amount of monomers and CTA(s) fed to the polymerization.

In one embodiment, the ethylene conversion is ≥29%, or ≥30%, or ≥31%, or ≥32%.

In one embodiment, the ethylene is fed to a first reaction zone (1) and to three subsequent reaction zones, and wherein the following are met: a) the first reaction zone receives make-up ethylene; b) the second ethylene based feed to the reactor contains make-up ethylene; c) the third ethylene based feed to the reactor doesn't contain make-up ethylene; d) the fourth optional ethylene based feed to the reactor does not contain make-up ethylene. In one embodiment, the ethylene is fed to a first reaction zone (1) and to two subsequent reaction zones, and wherein the following conditions are met: a) the first reaction zone receives make-up ethylene; b) the second ethylene based feed to the reactor does not contain make-up ethylene; c) the third ethylene based feed to the reactor does not contain make-up ethylene. In one embodiment, the ethylene is fed to a first reaction zone (1) and to one subsequent reaction zone, and wherein the following conditions are met: a) the first reaction zone receives make-up ethylene; and b) the second ethylene based feed to the reactor does not contain make-up ethylene. In one embodiment, the ethylene is fed to a first reaction zone (1) and to two or more subsequent reaction zone, and wherein the following conditions are met: a) the first reaction zone doesn't contain make-up ethylene; b) the second ethylene based feed to the reactor doesn't receive make-up ethylene; c) the third ethylene based feed to the reactor receive make-up ethylene; d) the fourth optional ethylene based feed to the reactor contain make-up ethylene.

In one embodiment, the first ethylene feed stream comprises from 20 to 100 mole %, or from 25 to 100 mole %, or from 30 to 100 mole %, or from 35 to 100 mole %, or from 40 to 100 mole %, or from 45 to 100 mole %, or from 50 to 100 mole % of the total amount of CTA added to the polymerization. In a further embodiment, the activity of the CTA system in the first ethylene-based feed is greater than, or equal to, the activity of the CTA system in each subsequent ethylene-based feed. In a further embodiment, the activity of the CTA system in the first ethylene feed is equal to the activity of the CTA system in the second ethylene feed. In another embodiment, the activity of the CTA system in the first ethylene feed is greater than the activity of the CTA system in the second ethylene-based feed.

In one embodiment, the ratio (Y) of the normalized MWD of the broad to narrow MWD polymer produced, at a constant ethylene conversion, is selected from the following:

$$(A^*\ln(Cs_{narrow\ MWD\ process}/Cs_{broad\ MWD\ process})+1)^* \\ (B^*\log(m)+(-2.1^*B+0.8)) \le Y \le (A^*\ln \\ (Cs_{narrow\ MWD\ process}/Cs_{broad\ MWD\ process})+1)^* \\ (-6.5^*\log(m)]+14.0); \quad (I)$$

$$(A^*\ln(Cs_{narrow\ MWD\ process}/Cs_{broad\ MWD\ process})+1)^* \\ (B^*\log(m)+(-2.1^*B+0.8)) \le Y \le (A^*\ln \\ (Cs_{narrow\ MWD\ process}/Cs_{broad\ MWD\ process})+l)^* \\ (-7.0^*\log(m)+15.0); \quad (II)$$

$$(A^*\ln(Cs_{narrow\ MWD\ process}/Cs_{broad\ MWD\ process})+1)^* \\ (B\times\log(m)+(-2.1^*B+0.8)) \le Y \le (A^*\ln \\ (Cs_{narrow\ MWD\ process}/Cs_{broad\ MWD\ process})+1)^* \\ (-7.5^*\log(m)+16.0);\ or \quad (III)$$

$$(A^*\ln(Cs_{narrow\ MWD\ process}/Cs_{broad\ MWD\ process})+1)^* \\ (B^*\log(m)+(-2.1^*B+0.8)) \le Y \le (A^*\ln \\ (Cs_{narrow\ MWD\ process}/Cs_{broad\ MWD\ process})+1)^* \\ (-8.0^*\log(m)+17.0); \quad (IV)$$

wherein A is in the range from 0.09 to 0.11, or from 0.09, or 0.10; and B is in the range from −1.1 to −1.9, or from −1.1 or −1.4, or from −1.1 to −1.9; and where m=mol % of ethylene based feed to the first reaction zone (based on the total moles of feed to the reactor); and wherein each polymer has the same melt index (I2); and wherein $Cs_{narrow\ MWD\ process}$ is the average Cs value of the CTA system at the outlet of the reactor configuration used to produce the narrow MWD polymer, and wherein $Cs_{broad\ MWD\ process}$ is average Cs value of the CTA system at the outlet of the reactor configuration used to produce the broad MWD polymer.

In one embodiment, Y is ≥1.8, or Y is ≥2.0, or Y is ≥2.3, or Y is ≥2.5, or Y is ≥2.8. In one embodiment, the ratio (Q) of the "broad to narrow MWD polymer polymerized" is as follows: (I) 1≤Q≤A*ln($Cs_{narrow\ MWD\ process}$/$Cs_{broad\ MWD\ process}$)+1)*(−13.0×log(m)+29.0); or (II) (A*ln($Cs_{narrow\ MWD\ process}$/$Cs_{broad\ MWD\ process}$)+1)*([B*log(m)]+(−2.0*B+2.7))≤Q≤(A*ln($Cs_{narrow\ MWD\ process}$/$Cs_{broad\ MWD\ process}$)+1)*(−13.0×log(m)+29.0); or (III) 1≤Q≤A*ln($Cs_{narrow\ MWD\ process}$/$Cs_{broad\ MWD\ process}$)+1)*(−12.0×log(m)+27.0); or (IV) (A*ln($Cs_{narrow\ MWD\ process}$/$Cs_{broad\ MWD\ process}$)+1)*([B*log(m)]+(−2.0*B+2.7))≤Q≤(A*ln($Cs_{narrow\ MWD\ process}$/$Cs_{broad\ MWD\ process}$)+1)*(−12.0×log(m)+27.0); or (V) 1≤Q≤A*ln($Cs_{narrow\ MWD\ process}$/$Cs_{broad\ MWD\ process}$)+1)*(−11.0×log(m)+25.0); or (VI) (A*ln($Cs_{narrow\ MWD\ process}$/$Cs_{broad\ MWD\ process}$)+1)*([B*log(m)]+(−2.0*B+2.7))≤Q≤(A*ln($Cs_{narrow\ MWD\ process}$/$Cs_{broad\ MWD\ process}$)+1)*(−11.0×log(m)+25.0); or (VII) 1≤Q≤A*ln($Cs_{narrow\ MWD\ process}$/$Cs_{broad\ MWD\ process}$)+1)*(−10.0×log(m)+23.0); or (VIII) (A*ln($Cs_{narrow\ MWD\ process}$/$Cs_{broad\ MWD\ process}$)+1)*([B*log(m)]+(−2.0*B+2.7))≤Q≤(A*ln($Cs_{narrow\ MWD\ process}$/$Cs_{broad\ MWD\ process}$)+1)*(−10.0×log(m)+23.0); wherein m=mol % of ethylene based feed to the first reaction zone (based on the total moles of feed to the reactor); and wherein each polymer has the same melt index (I2); and wherein $Cs_{narrow\ MWD\ process}$ is average Cs value of the CTA system at the outlet of the reactor system used to produce the narrow MWD polymer, and wherein $Cs_{broad\ MWD\ process}$ is average Cs value of the CTA system at the outlet of the reactor system used to produce the broad MWD polymer, where A is in the range from 0.09 to 0.11, or from 0.09 to 0.1, or from 0.09 to 0.11; B is in the range from −4.3 to −2.3 or from −4.3 to −3.3, or from −4.3 to −3.8.

In one embodiment, Q is ≥4.0, or Q is ≥4.5, or Q is ≥5.0, or Q is ≥5.5, or Q is ≥6.0.

In one embodiment, the ratio (W) of the normalized MWD of the broad MWD to narrow MWD polymers produced, at constant ethylene conversion, is selected the following:

$$0.9 \leq W \leq (A * \ln(Cs_{narrow\ MWD\ process}/Cs_{broad\ MWD\ process}) + 1) * \qquad (I)$$
$$(-6.5 * \log(m) + 14.0) * \left(\left(1 - 0.115 * \frac{P_B - P_N}{400\ \text{Bar}}\right)\right);$$

$$(A * \ln(Cs_{narrow\ MWD\ process}/Cs_{broad\ MWD\ process}) + 1) * \qquad (II)$$
$$(B * \log(m) + (-2.1 * B + 0.8)) * \left(\left(1 - 0.115 * \frac{P_B - P_N}{400\ \text{Bar}}\right)\right) \leq$$
$$W \leq (A * \ln(Cs_{narrow\ MWD\ process}/Cs_{broad\ MWD\ process}) + 1) *$$
$$(-6.5 * \log(m)] + 14.0) * \left(\left(1 - 0.115 * \frac{P_B - P_N}{400\ \text{Bar}}\right)\right);$$

$$0.9 \leq W \leq (A * \ln(Cs_{narrow\ MWD\ process}/Cs_{broad\ MWD\ process}) + 1) * \qquad (III)$$
$$(1 - 7.0 * \log(m) + 15.0) * \left(\left(1 - 0.115 * \frac{P_B - P_N}{400\ \text{Bar}}\right)\right);$$

$$(A * \ln(Cs_{narrow\ MWD\ process}/Cs_{broad\ MWD\ process}) + 1) * \qquad (IV)$$
$$(B * \log(m) + (-2.1 * B + 0.8)) * \left(\left(1 - 0.115 * \frac{P_B - P_N}{400\ \text{Bar}}\right)\right) \leq$$
$$W \leq (A * \ln(Cs_{narrow\ MWD\ process}/Cs_{broad\ MWD\ process}) + 1) *$$
$$(-7.0 * \log(m) + 15.0) * \left(\left(1 - 0.115 * \frac{P_B - P_N}{400\ \text{Bar}}\right)\right);$$

$$0.9 \leq W \leq (A * \ln(Cs_{narrow\ MWD\ process}/Cs_{broad\ MWD\ process}) + 1) * \qquad (V)$$
$$(-7.5 * \log(m) + 16.0) * \left(\left(1 - 0.115 * \frac{P_B - P_N}{400\ \text{Bar}}\right)\right);$$

$$(A * \ln(Cs_{narrow\ MWD\ process}/Cs_{broad\ MWD\ process}) + 1) * \qquad (VI)$$
$$(B \times \log(m) + (-2.1 * B + 0.8)) * \left(\left(1 - 0.115 * \frac{P_B - P_N}{400\ \text{Bar}}\right)\right) \leq$$
$$W \leq (A * \ln(Cs_{narrow\ MWD\ process}/Cs_{broad\ MWD\ process}) + 1) *$$
$$(-7.5 * \log(m) + 16.0) * \left(\left(1 - 0.115 * \frac{P_B - P_N}{400\ \text{Bar}}\right)\right);$$

$$0.9 \leq W \leq (A * \ln(Cs_{narrow\ MWD\ process}/Cs_{broad\ MWD\ process}) + 1) * \qquad (VII)$$
$$(-8.0 * \log(m) + 17.0) * \left(\left(1 - 0.115 * \frac{P_B - P_N}{400\ \text{Bar}}\right)\right); \text{or}$$

$$(A * \ln(Cs_{narrow\ MWD\ process}/Cs_{broad\ MWD\ process}) + 1) * \qquad (VIII)$$
$$(B * \log(m) + (-2.1 * B + 0.8)) * \left(\left(1 - 0.115 * \frac{P_B - P_N}{400\ \text{Bar}}\right)\right) \leq$$
$$W \leq (A * \ln(Cs_{narrow\ MWD\ process}/Cs_{broad\ MWD\ process}) + 1) *$$
$$(-8.0 * \log(m) + 17.0) * \left(\left(1 - 0.115 * \frac{P_B - P_N}{400\ \text{Bar}}\right)\right);$$

and wherein A is in the range from 0.09 to 0.11, or from 0.09, or from 0.1, or 0.11; B is in the range from −1.1 to −1.9 or from −1.1 to −1.4, or from −1.1 to −1.9; $P_B$ is the inlet pressure for the "$MWD_B$ broad polymer;" $P_N$ is the inlet pressure for the "$MWD_N$ polymer." In one embodiment, the "0.1*ln($Cs_{narrow\ MWD\ process}$/$Cs_{broad\ MWD\ process}$)+1" is from 0.5 to 1.5, or from 0.6 to 1.4.

In one embodiment, W is ≥1.7, or W is ≥1.8, or W is ≥1.9 or W is ≥2.0, or W is ≥2.1, or W is ≥2.2, or W is ≥2.3.

In one embodiment, the number of reaction zones is ≥3, or ≥4, or ≥5, or ≥6, or ≥10. In one embodiment, the reactor system comprises ≥3, or ≥4, or ≥5, or ≥6 ethylene-based feed streams. In one embodiment the reactor configuration comprises at least one tubular reactor. In one embodiment the only reactors in the reactor configuration are tubular reactors, and further, if two or more tubular reactors are present, these reactors are in a series configuration. In one embodiment, the first reaction zone is a tubular reaction zone. In a further embodiment, each reaction zone is a tubular reaction zone. In one embodiment, the reactor configuration comprises at least one tubular reactor, and each tubular reactor is equipped with one or multiple heat transfer zones, and where heat is ex-changed between the process side and a heat transfer medium. Define multiple heat transfer zone. A heat transfer zone consists of one or more heat transfer jackets around one of more high pressure reactor tubes. The inlet and the outlet of each heat transfer jacket are connected in series or in parallel with the inlet and the outlet of the heat transfer medium of the heat transfer zone In one embodiment, the reactor configuration comprises at least one tubular reactor, and the cooling and/or heating to each reactor, is provided by pressurized liquid water operating in a co-current mode and/or counter current mode, in multiple cooling zones surrounding the reactor. In one embodiment, the reactor system comprises at least one Primary Compressor, at least one Booster compressor, and at least one Hyper compressor.

In one embodiment, the ethylene fed to the first reaction zone is at least 10 mole percent of the total ethylene fed to the polymerization. In one embodiment, the ethylene fed to the first reaction zone is 10 to 70 mole percent, or 20 to 65 mole percent, or 25 to 60 mole percent, or 30 to 55 mole percent, or 45 to 55 mole percent of the total ethylene fed to the polymerization. In one embodiment, the total amount of make-up (fresh) ethylene is distributed to all reaction zones. In one embodiment, the make-up ethylene is only distributed to the reaction zone i (i>1). In one embodiment, total amount of make-up (fresh) CTA is only distributed to the first reaction zone. In one embodiment, no make-up CTA is distributed to the first reaction zone. In one embodiment, total amount of make-up CTA is distributed to all reaction zones receiving an ethylene based feed flow. In one embodiment, each feed to each reaction zone contains the same CTA system. In a further embodiment the CTA system of each feed contains a single CTA.

In one embodiment, the peak polymerization temperature in the reaction zone 1 for producing a polymer with narrow MWD, is <260° C., or <255° C., or <250° C., or <245° C. In one embodiment, the peak polymerization temp. in the reaction zones 1 and 2 for producing a polymer with narrow MWD, is <260° C., or <255° C., or <250° C., or <245° C. In one embodiment, peak polymerization temp. in the reaction zone 1, 2 and 3 for producing a polymer with narrow MWD, is <260° C., or <255° C., or <250° C., or <245° C.

In one embodiment, the peak polymerization temperature in the reaction zone 1 for producing a polymer with broad MWD, is >300° C., or >305° C., or >310° C., or >315° C. In one embodiment, the peak polymerization temperature in the reaction zone 1 and 2 for producing a polymer with broad MWD, is >300° C., or >305, or >310° C. or >315° C. In one embodiment, the peak polymerization temperature in the reaction zone 1, 2 and 3 for producing a polymer with broad MWD, is >300° C., or >305° C., or >310° C., or >315° C.

In one embodiment, the mixture further comprises at least one CTA selected from an aldehyde, an alkane, a ketone, an alcohol, an ester, a mercaptan, a phosphine, a phosgene, an alpha-olefin, or a combination thereof. In one embodiment, the mixture further comprises at least one CTA selected from an aldehyde, an alkane, a ketone, an alcohol, an ester, an alpha-olefin, or a combination thereof. In one embodiment, the mixture comprises a CTA with a Cs value <1.00, or <0.80, <0.60, <0.40. In one embodiment, the mixture comprises one or more CTAs, and each CTA has a Cs value <1.00, or <0.80, <0.60, <0.40.

In one embodiment, the ethylene-based polymer is a polyethylene homopolymer. In one embodiment, the ethylene-based polymer is LDPE. In one embodiment, the ethylene-based polymer is an ethylene-based interpolymer comprising at least one comonomer. In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers, which have a combined monomer and CTA functionality, may have 3 to 10, or 3 to 8 carbon atoms. Exemplary α-olefins include, but are not limited to, propylene, 1-butene, 1-pentene, 1-hexene, 1-heptene, 1-octene, 1-nonene, 1-decene, and/or 4 methyl-1-pentene. Further, the α-olefin comonomers are selected from propylene and/or 1-butene.

Free radical initiators are generally used to produce the inventive ethylene-based polymers. A free radical initiator, as used here, refers to a free radical generated by chemical and/or radiation means. Free radical initiators include organic peroxides including cyclic peroxides, diacyl peroxides, dialkyl peroxides, hydroperoxides, peroxycarbonates, peroxy-dicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001 to 0.2 wt %, based upon the weight of polymerizable monomers. In one embodiment, an initiator is added to at least one reaction zone, which has a half-life temperature, at one second, >255° C., preferably >260° C. In an embodiment, such initiators are used at a peak polymerization temperature from 320° C. to 350° C. In a further embodiment, the initiator comprises at least one peroxide group incorporated in a ring structure, such as initiators include TRIGONOX™ 301 (3,6,9-triethyl-3,6,9-trimethyl-1,4,7-triperoxonaan) and TRIGONOX™ 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) from United Initiators. See also WO 02/14379 and WO 01/68723. Furthermore oxygen can be used as initiator. The mixture of single or multiple initiators, potentially diluted with a solvent, injected into a reaction zone i is called initiation system for reaction zone i.

In one embodiment, the polymerization pressure as measured at the first inlet of the reactor is from 1000 Bar to 3200 bar, or from 1200 to 3100 Bar, or from 1400 to 3000 Bar, or from 1600 to 2800 Bar, or from 1800 to 2600 Bar.

In one embodiment, the invention provides a process for controlling product MWD and associated product properties like melt elasticity, G' and melt strength through process conditions like peak temperatures, start and re-initiation temperatures, CTA and make-up ethylene distribution, ethylene-based feed stream to the multiple reaction zones while maintaining the reactor inlet pressure and ethylene conversion. Melt elasticity, melt strength and/or other rheological properties are influenced by MWD. Depending on the final end-usage, different product quality targets are set for each product grade. An inventive process may comprise a combination of two or more embodiments described herein.

The invention also provides an ethylene-based polymer made by an inventive process.

In one embodiment, the ethylene-based polymer is a polyethylene homopolymer. In another embodiment, the ethylene-based polymer is an ethylene-based interpolymer.

In one embodiment, the ethylene-based polymer is LDPE.

In one embodiment, the ethylene-based polymer has a density from 0.910 to 0.940 g/cc, or from 0.912 to 0.937 g/cc, or from 0.914 to 0.935 g/cc, or from 0.916 to 0.932 g/cc. In one embodiment, the ethylene-based polymer has a melt index from 0.1 to 1000 g/10 min, or from 0.1 to 500 g/10 min, or from 0.1 to 100 g/10 min, or from 0.1 to 50 g/10 min, or from 0.1 to 20 g/10 min.

An inventive polymer may comprise a combination of ≥2 embodiments as described herein. The invention also provides a composition comprising an inventive ethylene-based polymer. In one embodiment, the composition further comprises another ethylene-based polymer, for example, an LLDPE. An inventive composition may comprise one or more additives, such as, stabilizers (e.g., antioxidants), plasticizers, antistatic agents, pigments, dyes, nucleating agents, fillers, slip agents, fire retardants, processing aids, smoke inhibitors, viscosity control agents and anti-blocking agents. The polymer composition may comprise less than 10 wt % of the sum weight of one or more additives, based on the weight of the composition. The polymers, polymer blends and compositions of this invention may be employed in a variety of conventional thermoplastic fabrication processes to produce useful articles, including extrusion coating onto various substrates; monolayer and multilayer films; molded articles, such as blow molded, injection molded, or rotomolded articles; coatings; fibers; and woven or non-woven fabrics. An inventive polymer may be used in a variety of films, including but not limited to, clarity and/or shrink films, collation shrink films, cast stretch films, silage films, stretch hood, sealants, diaper back sheets, wires and cables, gaskets and profiles, adhesives; footwear components, and auto interior parts.

Definitions

Unless stated to the contrary, implicit from the context, or customary in the art, all parts and percents are based on weight, and all test methods are current as of the filing date of this application. The term "composition", as used herein, includes a mixture of materials, which comprise the composition, as well as reaction products and decomposition products formed from the materials of the composition. The terms "blend" or "polymer blend," as used, refers to a mixture of two or more polymers. A blend may or may not be miscible (not phase separated at molecular level). A blend may or may not be phase separated. The terms "comprising," "including," "having," and their derivatives, do not exclude the presence of any additional component, step or procedure, whether or not the same is specifically recited. The term, "consisting essentially of" excludes from the scope of any succeeding recitation, any other component, step, or procedure, except those that are not essential to operability. The term "consisting of excludes any component, step, or procedure not specifically recited.

The term "high pressure polymerization process," as used herein, refers to a free radical polymerization process carried out at an elevated pressure of at least 1000 bar (100 MPa).

The terms "feed," 'feed flow," or "feed stream," as used herein, refer to make-up and/or recycled components (for example, ethylene, initiator, CTA, and/or solvent) added to a reaction zone at an inlet. The terms "ethylene-based feed stream" or "ethylene feed" or "ethylene based feed stream," or "ethylene feed," as used herein, refer to a feed stream to a reaction zone, and which contains a majority amount of ethylene, based on the molar amount of all of the components in the feed stream. Optionally one of more CTAs, comonomers, other process components (like lubrication oil, solvent, etc.) and/or impurities (as for instance initiator degradation products) might be present in the feed stream.

The terms "ethylene conversion" refer to weight percentage of the total amount of ethylene fed to the reactor, which is incorporated into the final polymer produced; and {[(weight of polymer produced)/(total weight of ethylene fed to the reactor]×100}=ethylene conversion in wt %. When propylene is used as a chain transfer agent, the amount of propylene is included in the calculation, such that, {[(weight of polymer produced)/(total weight of ethylene and propylene fed to the reactor]×100}=ethylene conversion in wt %].

The term "LCB content" refers to a level of long chain branches per 1000 carbons (total carbons) incorporated in the polymer. The LCB content is calculated with the help of kinetics on "Transfer to Polymer" and "Propagation" of ethylene and optionally present comonomers. The LCB content can be given as level in the final polymer (final product LCBf), in the progressing polymer formation along the reactor (cumulative LCBf) or in the locally formed polymer as function of the local polymerization conditions in the reactor (local LCBf).

The term "composition," as used herein, includes a mixture of materials which comprises the composition, as well as reaction products and decomposition products formed from the materials of the composition. The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer. The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer. The term "ethylene-based interpolymer" refers to an interpolymer that comprises a majority amount of polymerized ethylene, based on the weight of the interpolymer, and at least one comonomer. The term "ethylene-based copolymer" refers to a copolymer that comprises a majority amount of polymerized ethylene, based on the weight of the copolymer, and a comonomer as the only monomer types.

The terms "side stream" or "side feed stream," as used herein, refer to the ethylene based feed stream, CTA system feed stream, and/or initiator system, to sequential reaction zones.

The term "reactor system," as used herein, refers to the devices used to polymerize and isolate a polymer. Such devices include, but are not limited to, one or more reactors, reactor pre-heater(s), monomer-reactor cooling device(s), Secondary compressor(s) (or Hyper compressor(s)), Primary compressor(s), and/or Booster compressor(s). The term "tubular reactor system," as used herein, refers to a reactor system that comprises only one or more tubular reactor(s) as the reactor(s) of the reactor system, and exclude autoclave reactors. When more than one tubular reactor is used, they are preferably used in a series configuration. The term "reactor configuration," as used herein, refers to one or more reactors, and optionally one or more reactor pre-heaters, used to polymerize a polymer.

The term "inlet pressure," "reactor inlet pressure," or "inlet pressure of the first reaction zone," as used herein, refers to the pressure level at the first inlet of the first reaction zone.

The term "reaction zone," as used herein, refers to a reactor zone where polymerization reaction is initiated or reinitiated by the addition of free radicals or components which dissociate into and/or generate free radicals. Typically, the reaction medium is heated and/or cooled by a heat transfer medium flowing through a jacket around the reactor. A reaction zone may also start with the addition of make-up and/or recycled ethylene, and/or free radicals or components which dissociate into and/or generate free radicals. The term "first reaction zone," as used herein, refers to the first reactor zone where the polymerization is initiated by the addition of radicals and/or components which dissociate into and/or generate radicals. The first reaction zone ends at the point where there is a new feed of radicals, and/or components which dissociate into and/or generate radicals, and, optionally, make-up and/or recycled ethylene and/or comonomer(s). The term "subsequent reaction zone," and similar terms, as used herein, refers to the reaction zone following a previous reaction zone is ended, and which is started by a new feed of radicals, and/or components which dissociate into and/or generate radicals, and, optionally, make-up and/ or recycled ethylene and/or comonomer(s) are fed into the reactor system at a new downstream of the reactor system.

The phrase "peak temperature for a reaction zone," or "peak temperature," as used herein, refers to the highest temperature measured in a reaction zone. The phrase "the average of the max. or peak temperature in the reaction zones," as used herein, refers to the sum of the max. or peak temperatures in the reaction zones divided by the number of reaction zones.

The term "recycled," when used herein, in reference to a reactant (i.e., "recycled ethylene," "recycled CTA"), refers to unreacted reactant separated from the polymer in the high pressure separator(s) and/or the low pressure separator(s), and returned/compressed to the reactor.

The term "CTA system" includes a single CTA, or a mixture of CTAs, added to the polymerization process, typically to control the melt index. A CTA system includes a component able to transfer a hydrogen atom to a growing polymer molecule containing a radical, by which the polymer radical is terminated and a new radical is formed on the CTA molecule, which can then initiate a new polymer chain. CTA is also known as telogen or telomer. The terms "CTA activity" or "chain transfer activity coefficient (Cs value)" as used herein, refer to the ratio between the "rate of chain transfer" to the "rate of ethylene propagation." See Mortimer references provided in the experimental section below.

The terms "Z1/Zi" as used herein is determined as follows. The "reactor zone molar concentration of a $CTA_j$ in a reactor zone i $([CTA]_{ji})$" is defined as the "total molar amount of that CTA fed into reactor zones k=1 to k=i" divided by the "total molar amount of ethylene fed into reactor zones 1 to i." Note i≥1. This relationship is shown in Eqn. AC:

$$[CTA]_{j_k} = \frac{\sum_{k=1}^{i} n_{CTA,j_k}}{\sum_{k=1}^{i} n_{eth_k}}.$$ (Eqn. AC)

In Equation AC, j≥1, $n_{CTA,k_k}$ is the "amount of moles of the jth CTA injected to the kth reactor zone (where k=1 to i)," and $n_{eth_k}$ is the "amount of moles of ethylene injected to the kth reactor zone (where k=1 to i)." The "transfer activity or activity of a CTA (system) in a reactor zone I (Zi)" is defined as the "sum of the reactor zone molar concentration of each CTA in the reactor zone" multiplied with its chain transfer activity constant (Cs)—see Equation BC. The chain transfer activity constant (Cs) is the ratio of reaction rates Ks/Kp, at a reference pressure (1360 atm) and a reference temperature (130° C.). This relationship is shown in Eqn. BC, where $n_{compi}$ is the total number of CTAs in reactor zone i. Note i≥1, and $$n_{compi} \geq 1.$$ (Eqn. BC)
$$Z_i = \sum_{j=1}^{n_{compi}} [CTA]_{j_k} \cdot C_{s,j}.$$

In one embodiment, $Z_1/Z_i$ is controlled to be greater than 1. In another embodiment, $Z_1/Z_i$ is controlled to be less than 1. In another embodiment, $Z_1/Z_i$ is controlled to be from 0.2 to 2.0, or from 0.3 to 1.8, or 0.4 to 1.6 or 0.5 to 1.5. The term "$Cs_{narrow\ MWD\ process}$" as used herein, refers to an average Cs value of the CTA system at the outlet of the reactor configuration used to produce narrow MWD polymer. The term "$Cs_{broad\ MWD\ process}$" as used herein, refers to an average Cs value of the CTA system at the reactor outlet of the reactor configuration used to produce broad MWD polymer.

The term "average Cs at the outlet of the reactor configuration" refers to the molar weighted compositional Cs of the components with chain transfer activity at the outlet of the reactor configuration, which is calculated as the sum of each individual Cs value multiplied with each individual mole fraction in the total CTA system at the reactor outlet of the reactor configuration. For example: CTA A with Cs of 0.3 and mole fraction of 0.2, CTA B with Cs of 0.05 and mole fraction of 0.2, CTA C with Cs of 0.01 and mole fraction of 0.6. The average Cs at the outlet of the reactor configuration is 0.3*0.2+0.05*0.2+0.01*0.6=0.076. The CTA amount at the outlet can be measured by an on-line analyzer, such as an on-line FTIR analyzer.

The term "initiator system" includes a single initiator, or a mixture of initiators, each typically dissolved in a solvent (for example, a hydrocarbon solvent) added to the polymerization process.

The term "make-up," when used herein, in reference to a feed component (i.e., "make-up ethylene or make-up ethylene feed," "make-up CTA or make-up CTA feed"), refers to a feed provided to compensate for the ethylene, or CTA, or other respective component, consumed by the polymerization and/or lost through, for example, ethylene-based purge from the process, and residual component in the polymer.

The term "mole fraction," as used herein, refers to the molar ratio of one component in a mixture to the total moles of the components of the mixture. Molar fraction can be determined by calculating the ratios of molar amounts or molar flows.

The phrase "mole fraction of make-up ethylene fed to the first reaction zone (FE1)," as used herein, refers to the molar amount of make-up ethylene fed (via a front stream) to the first reaction zone, divided by the molar amount of ethylene plus optional comonomer(s) plus optional CTA(s) fed to all reaction zones. The phrase "mole fraction of make-up ethylene fed to the nth reaction zone (FEn)," as used herein, refers to the molar amount of make-up ethylene fed (via a side stream) to the nth reaction zone divided by the molar amount of ethylene plus optional comonomer(s) plus optional CTA(s) fed (via a side stream) to reaction zones. The term "RFEn=FE1/FEn," as used herein, refers to, for reaction zone n, the ratio of the "mole fraction of make-up ethylene fed to the first reaction zone (FE1)" to the "mole fraction of make-up ethylene fed to reaction zone n (FEn)". Calculation examples of make-up (fresh) ethylene ratio in ethylene based feed stream: FE1, FE2, FE3 and RFE2 and RFE3. Assumptions used for RFEn calculation in all configurations from FIG. 1 to FIG. 5: Stream 13 and 15 have the same amount of CTA. The polymer going from HPS to LPS contains 20% of additional ethylene. Stream 13 is 20% of the polymer output of stream 12. Stream 1 (make-up ethylene) is the ethylene conversion+purge flow (stream 16) which is 1%. FE1 is the ratio of the amount of make-up (fresh) ethylene in the front ethylene based feed stream vs. the total amount of the front ethylene based feed stream. FE2 is the ratio of the amount of make-up (fresh) ethylene in the first side of ethylene based feed stream vs. the total amount of the first side ethylene based feed stream. FE2 is the ratio of the amount of make-up (fresh) ethylene in the second side ethylene based feed stream vs. the total amount of the second side ethylene based feed stream.

Example PEB20

Ethylene conversion: 34.9%. Purge flow: 1%. Ethylene in the Polymer from LPR: 7%. Make-up ethylene concentration at the outlet of the primary=(34.9%+1%)/(34.9%+1%+ 7%)=84%. Make-up ethylene concentration to the front (zone 1) FE1=84%*25%/25%=0.84. Make-up ethylene concentration in the $1^{st}$ side stream (zone 2) FE2=84%*(34.9%+ 1%+7%−25%)/25%=0.6. Make-up ethylene concentration in the 2nd side stream (zone 3) FE3=0. RFE2=FE1/ FE2=0.84/0.6=1.4. RFE3=FE1/FE3=0.84/0 (infinite). Example PEN20—Ethylene conversion: 28.2%. Purge flow: 1%. Ethylene in the Polymer from LPR: 5.6%. Make-up ethylene concentration in the outlet of the primary=(28.2%+ 1%)/(28.2%+1%+5.6%)=84%. Make-up ethylene concentration to the front ($1^{st}$ reaction zone), FE1=0. Make-up ethylene concentration in the $1^{st}$ side stream, FE2=0. Make-up ethylene concentration in the 2nd side stream, FE3= (28.2%+1%)/50% 0.58. RFE2=FE1/FE2=0/0=Infinite. RFE3=FE1/FE3=0/0.58=0.

Test Methods

Melt Index—Melt index, or I2, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes. Density—Samples for density measurement are prepared according to ASTM D 1928. Samples are pressed at 190° C. and 30,000 psi for three minutes, and then at (21° C.) and 207 MPa for one min. Measurements made within one hour of sample pressing using ASTM D792, Method B.

EXPERIMENTAL

Flow Scheme Used for PE1 to PE10, PE5.1, PE6.1

For each polymerization, in the tubular reactor system, the polymerization is initiated by a free radical initiation system injected, and/or activated, at the inlet of each reaction zone. The maximum temperature in each reaction zone is controlled at a set point, by regulating the concentration and/or adjusting the composition of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11), which is sent to the LPS for further separation. Ethylene stream (15) is cooled and cleaned in stream (17). Stream (16) is a purge stream to remove impurities and/or inerts. The polymer separated in LPS is further processed to polymer pellets in (12). The ethylene removed in the LPS is fed to the Booster, where, during the compression, condensables such as solvent, lubrication oil, and others components, are collected and removed through stream (14). The outlet of the Booster is combined with make-up ethylene stream (1), and further compressed by the Primary.

FIG. 1 shows a generalized flow scheme of a simulated high pressure polymerization plant configuration containing a tubular reactor, where the whole compressed flow from a hyper compressor is sent to the first (front) reaction zone of the reactor, representing 100/0/0/0 ethylene based feed distribution. Stream (1) is the ethylene make-up, which is compressed together, with the outlet of the Booster, by the Primary to stream (2). Stream (2) is combined with a high pressure recycle stream (HPR) line (18) to line (3) and is sent to the inlet of the secondary compressor system (Hyper). The secondary compressor system pressurizes the ethylene based feed stream to a sufficient level and feeds to the high pressure tubular reactor (Reactor). Stream (4) depicts the CTA system make-up (fresh) feed in this reactor configuration, which could be fed in the inlet (s), inter-stage(s) or outlet of the hyper. Alternatively stream (4) can be fed to the inlet, interstage(s) or outlet of Booster or Primary compressor systems. The CTA system can consist of either a single or multiple components and can include varying compositions. Stream (6) presents a potential comonomer feed. Comonomer streams (6) can be fed in the inlet(s), interstage(s), outlet(s) of the secondary compressor system and/or directly into the reaction zones. Alternatively stream (6) can be fed to the inlet, interstage(s) or outlet of Booster or Primary compressor systems. The discharge temp. of the secondary compressor system is typically in the range from 60 to 100° C. The ethylene based feed to the first reaction zone. zone is typically preheated to a temp. from 130 to 180° C.

Flow Scheme of PEB11 Through PEB18—

Figure 2:
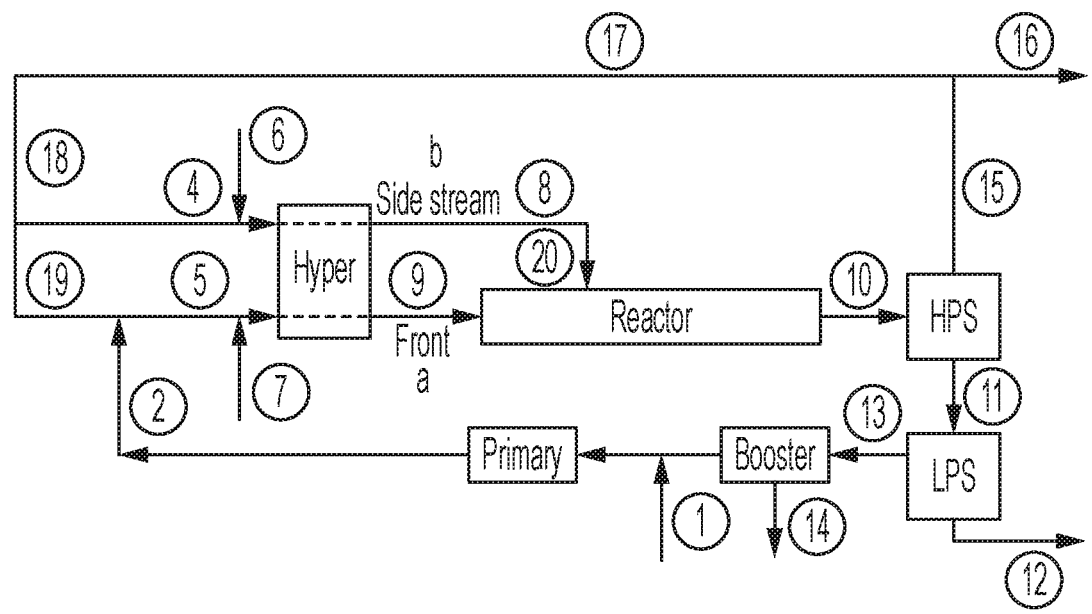
FIG. 2 is a process flow diagram containing a tubular reactor used for polymerization PEB11 to PEB18 (broad MWD).

FIG. 2 shows a generalized flow scheme of a simulated high pressure polymerization plant configuration containing a tubular reactor. In this flow sheet, ethylene based feed streams are distributed to the front and the side of the reactor according 50/50/0/0 ethylene based feed configuration, in which 50% of the total ethylene based feed stream is fed to the first reaction zone while the remaining 50% is sent to the second reaction zone. Stream (1) is the ethylene make-up, which is compressed together with the outlet of the Booster by the Primary to stream (2). The recycle stream (17) and (18) from HPR is split into a stream (4) which is sent to the Hyper compressor system and subsequently through line (8) and (20) to the side of the reactor. A smaller flow (line 19) is combined with stream (2) from Primary compressor system to stream (5), which is sent to the Hyper compressor system and fed via line (9) to the first reaction zone of the reactor. Stream (6) and/or stream (7) depict the CTA system make-up (fresh) feed. Optionally, comonomer(s) can be fed through stream (6) and/or (7). CTA make-up streams (4) and/or (5) can be fed in the inlet(s), interstage(s), out-let(s) of the secondary compressor system, and/or inlet(s) of the reaction zones. Alternatively stream (6) and/or (7) can be fed to the inlet, interstage(s) or outlet of Booster or Primary compressor systems. The remaining scheme—see above.

Flow Scheme Used for PEN11 to PEN18—

Figure 3:
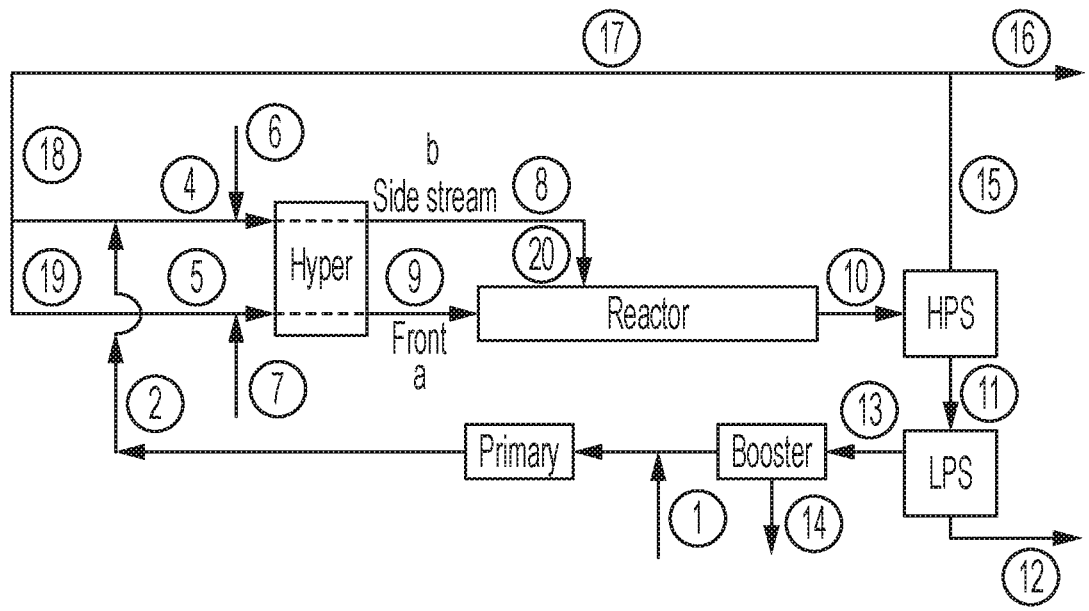
FIG. 3 is a process flow diagram for narrow MWD 50/50/0/0.
Figure 4:
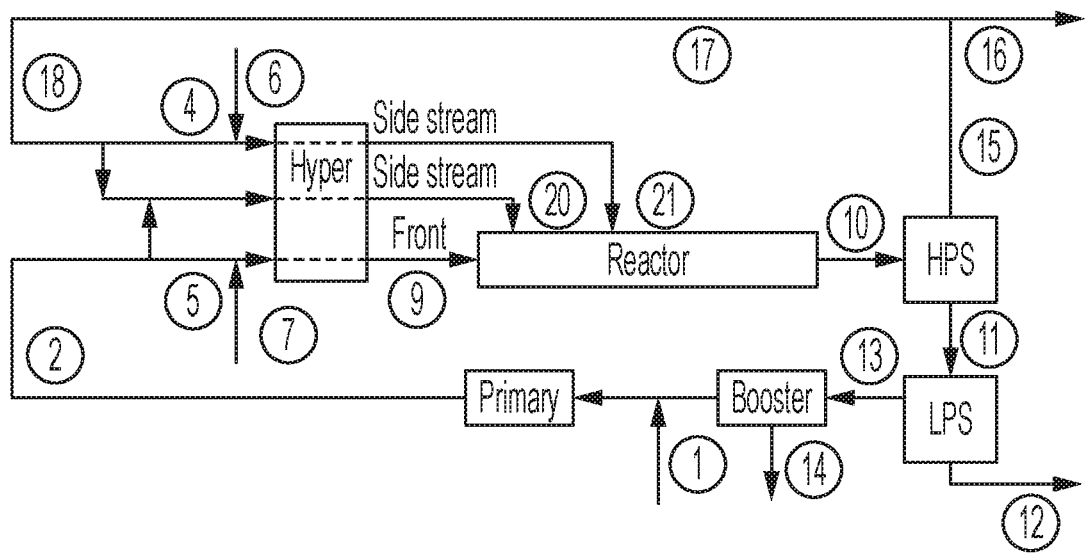
FIG. 4 is a process flow diagram for broad 25/25/50/0.

FIG. 3 represents the high pressure polymerization in which ethylene based feed stream is sent to the front (stream 9) and side (stream 20) of the reactor with 50/50/0/0 feed distribution. In FIG. 3, a major flow from HPR (line 17) is sent to the suction of the Hyper of which the discharge flow is distributed over the front of the reactor (line 9). The remaining HPR flow is combined with the flow from the primary compressor (line 2) containing very low CTA level and sent to the Hyper of which the discharge flow is distributed to the side of the reactor (line 20). This scheme shows that the front of the reactor receives max. HPR with high CTA level while the reactor side receives the max. make-up ethylene used to make narrow MWD polymers. Remaining streams see above. Flow Scheme of PEB19 to PEB23—FIG. 4 represents the high pressure polymerization with three ethylene based feed distribution (25/25/50/0/0) and four reaction zones. A major part of the HPR flow (line 18) is sent to the third reaction zone (line 21), while a remaining flow is combined with the remaining Hyper discharge flow from the Primary compressor (line 2), and distributed over the second reaction zone (line 20). The flow from Primary compressor containing almost no CTA will be mainly sent to the suction of the Hyper wherein the ethylene base feed discharge flow is sent to first reaction zone through line 9. Note that in this flow scheme, the first reaction zone (line 9) receives a maximum amount of make-up ethylene from the Primary (line 2) while the side streams (line 20 and 21) receive a maximum amount of CTA from the HPR flow. All other remaining streams are discussed above.

Flow Scheme of PEN19 to PEN23 and PEN19.1, PEN19.2—

Figure 5:
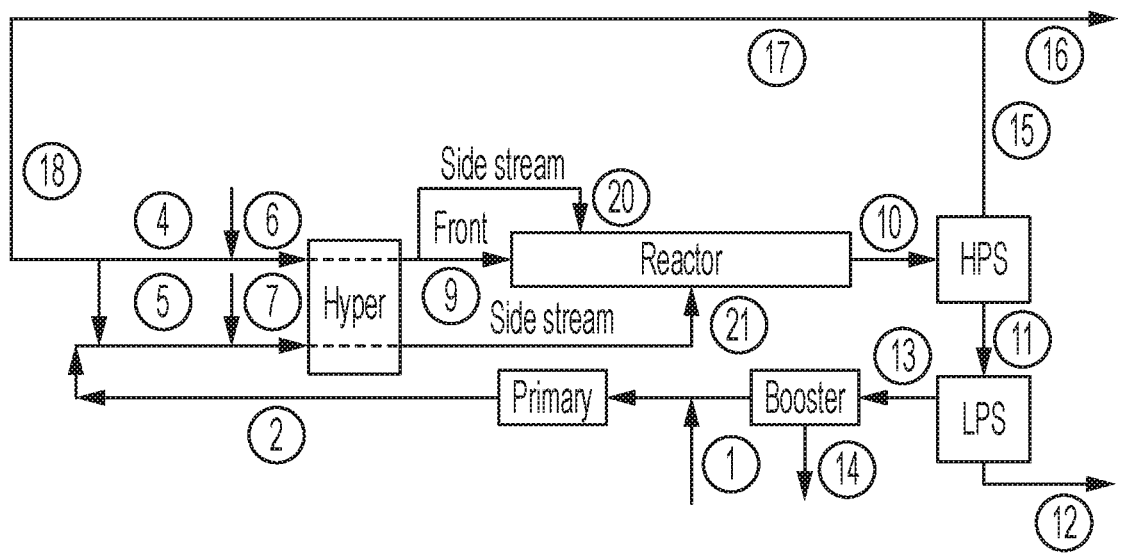
FIG. 5 is a process flow diagram for narrow 25/25/50/0.
Figure 6:
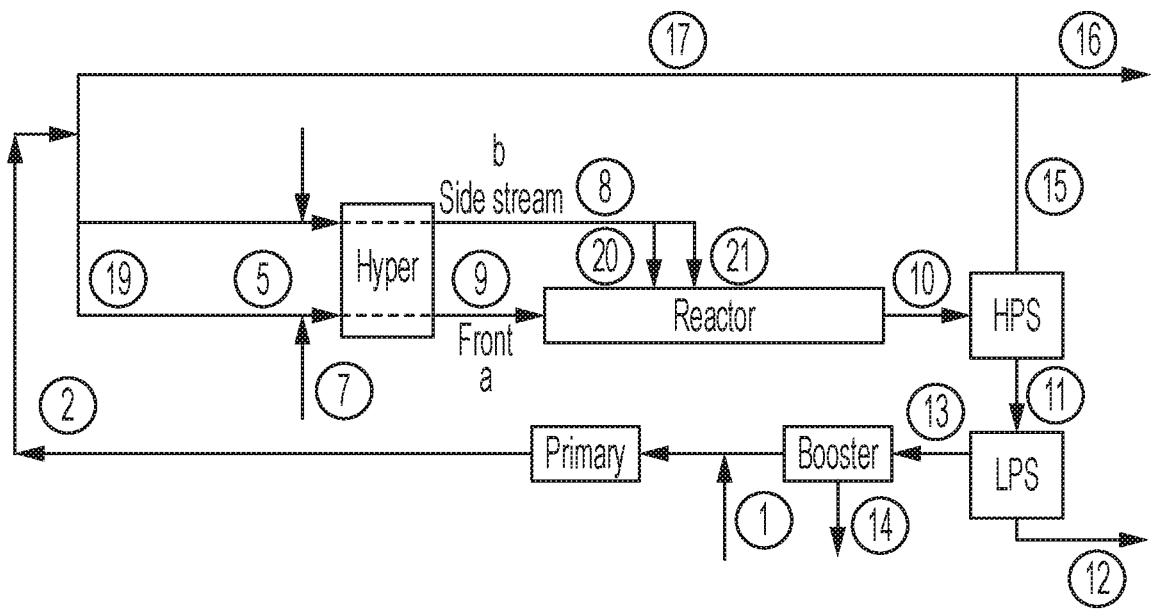
FIG. 6 is a process flow diagram for an even CTA distribution for 25/25/50/0/0.

FIG. 5 represents the high pressure polymerization comprising three ethylene based feed distribution (25/25/50/0/0) and with five reaction zones. The HPR flow (line 18) with high level of CTA is mainly sent to the suction of the Hyper of which the discharge flow is distributed over the front (line 9—first reaction zone) and side (line 20—second reaction zone) of the reactor system. The remaining HPR flow is combined with the Primary compressor flow which contains almost no CTA (line 2) and sent to the Hyper. This discharge flow from the Hyper is sent to the third reaction zone through line 21. All other remaining streams are discussed above. Flow Scheme used for PEB19.1 and PEB19.2—FIG. 6 shows a generalized flow scheme of a simulated, high pressure polymerization reactor system containing a tubular reactor used for PEB19.1 and PEB19.2 examples with three ethylene based feed distribution (25/25/50/0/0). In this flow scheme, High Pressure Recycle flow (line 17) is combined with Primary compressor flow (line 2) and distributed over the suction of the Hyper. It means that the CTA level is evenly distributed over the reaction zones. The Hyper pressurizes the ethylene feed stream to a level sufficient to feed the high pressure tubular reactor (Reactor). The discharge temperature of the Hyper is typically between 60 and 100° C. The ethylene feed to the first reaction zone is typically preheated to a temperature from 130 to 180° C., while the ethylene, fed to a side feed to the reactor, is fed at the Hyper discharge temperature, or cooled prior to feeding to the reactor. The discharge flow from the Hyper is then distributed over the front (first reaction zone—line 9) and side (line 20 and 21) of the reactor. It thus results in even CTA distribution process. Stream (6) and/or (7) depict the CTA system make-up (fresh) feed. The CTA make-up can, in principle, be freely distributed over the main compression streams fed and/or distributed over the side (line 8) and front (line 9). CTA make-up (line 6) and/or (line 7) can be fed in the inlet(s), interstage(s), outlet(s) of the Hyper, and/or inlet(s) of the reaction zones. The co-monomer flow can be fed to the suction of the Hyper via line 6 and/or line 7. Remaining parts of the reactor system—see above.

Polymerization Simulations

A polymerization simulation model with applied reaction scheme and kinetics is described by Goto et al. (Goto et al; Journal of Applied Polymer Science: Applied Polymer Symposium, 36, 21-40, 1981 (Title: Computer model for commercial high pressure polyethylene reactor based on elementary reaction rates obtained experimentally)). Other reactor and product modeling frameworks are available through ASPEN PLUS of Aspen Technology, Inc., Burlington, Mass., USA; and PREDICI of Dr. Wulkow, Computing in Technology GmbH (CiT), Rastede, Germany. Process and product responses predicted by these model frameworks are determined by the reactor parameters, the applied reaction scheme, and kinetic parameters. The applied reaction scheme and kinetic parameters are described below. The polymerization simulations were achieved with Goto, LDPE simulation model, as discussed above. The kinetic data used by Goto et al. was derived from high pressure, free radical polyethylene polymerization experiments, performed at varying temperature, pressure and polymer concentration, as described in the following references: K Yamamoto, M. Sugimoto; Rate constant for long chain-chain branch formation in free-radical polymerization of ethylene; J. Macromol. Science-Chem., A13 (8), pp. 1067-1080 (1979). The elementary reaction steps are described by Goto et al. as follows: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation. Kinetic data for main reactions are shown in Table 1, where ko is the pre-exponential or frequency factor; Ea is the activation energy, reflecting the temperature dependence; and $\Delta V$ is the activation volume, reflecting the pressure dependence. All kinetic constants are from Goto et al., except the ko, Ea and $\Delta V$ values for backbiting, which have been optimized to better reflect the level of methyl branches (by C13 NMR) in high pressure polyethylene, as a function of pressure and temperature conditions.

TABLE 1

Kinetic Constants for Main Reactions

| | Reaction | | |
|---|---|---|---|
| | ko | Ea | $\Delta V$ |
| | Units | | |
| | [m³/(hr*kmol)] | cal/mol | cm³/mol |
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs is given in Table 2. The kinetic constants have been calculated with the help of the kinetic constants on the Cs-value (ks/kp) as determined by Mortimer (see References below), and the ethylene propagation kinetics as given by Goto et al. (see Table 1).

TABLE 2

Kinetic Constants for Selected CTAs

| | Chain Transfer to Modifier | | | Reactivity Ratios | |
|---|---|---|---|---|---|
| Component | ko [m3/(h*kmol)] | Ea (cal/mol) | $\Delta V$ (cc/mol) | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| Isobutane (CTA) | 3.51E+11 | 14020 | −16.7 | 0.00 | 0.00 |

Propylene will beside of its CTA functionality also act as a comonomer, resulting in additional methyl branches. These additional methyl branches will typically lower the density of the polymer by 0.001 to 0.004 g/cc. Furthermore the comonomer activity will increase the overall consumption level per reactor pass, by which more propylene has to be added to compensate for the consumption as CTA as well as comonomer. References: General: G. *Luft, Chem.-Ing.-Tech., Hochdruck-Polyaethylen*, Vol. 51 (1979) Nr. 10, pages 960-969. Peroxide efficiency: T. van der Molen et al., *Ing. Chim. Ital, "Light-off" temperature and consumption of 16 initiators in LDPE production*, Vol. 18, N. 1-2, February 1982, pages 7-15. Chain transfer activity and comonomer reactivity data are described in the following: P. Ehrlich, G. A. Mortimer, *Fundamentals of the free radical polymerization of ethylene*, Adv. Polymer Sci., Vol. 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at 1360 atm and 130° C.*; Vol. 8, p 1513-1523 (1970); G. Mortimer, Journal of Polymer Science: Part A-1, *Chain transfer in ethylene polymerization. Part V. The effect of temperature*; Vol. 8, p 1535-1542 (1970); G. Mortimer, Journal of Polymer Science: Part A-1, *Chain transfer in ethylene polymerization Part V. The effect of pressure*, Vol. 8, p 1543-1548 (1970); and G. Mortimer, Journal of Polymer Science: Part A-1, *Chain transfer in ethylene polymerization VII. Very reactive and depleteable transfer agents*, Vol. 10, p 163-168 (1972). See LDPE simulation model in S. Goto et al., *Journal of Applied Polymer Science: Applied Polymer Symposium*, 36, 21-40, 1981 (Title: *Computer model for commercial high pressure polyethylene reactor based on elementary reaction rates obtained experimentally*).

Detail of Tubular Reactor Simulations—

Table 3 and Table 4 present the reactor configurations and process conditions for inventive and comparative polymerizations. The CTA types used for simulations, to control melt index, are propionaldehyde (PA), propylene and isobutane. PA has the activity (Cs) of 0.33 and a reactor ethylene conversion of about 10%, Propylene has Cs of 0.012 and an assumed reactor ethylene conversion of about 20%, since it has both CTA and comonomer functionality, while isobutane has Cs of 0.0072 and a reactor ethylene conversion/make-up of about 1%. The melt index of polymers used in the simulations is 0.2 g/10 min, 1 g/10 min and 10 g/10 min, and can be easily extended to a wider MI range. The polymerizations are simulated for a high pressure tubular reactor, operating at a reactor inlet pressure equal or below 320 MPa (3200 bar), using an ethylene-based throughput of 60 metric tons/hr. The ethylene based feed flow coming from the hyper compressor is split in 100/0/0/0 (PE1 through PE10), or 50/50/0/0 (PEB11 through PEB18 and PEN11 through PEN18) or 25/25/50/0 (PEB19 through PEB23 and PEN19 through PEN23). A tubular reactor configuration comprises up to several thousand meters of total length, for four or more reaction zones. In this invention, the reactor length is varying from 1250 to 1450 meter, depending on the reactor configuration. The inside diameters of the reactor tubes are varied from 27 mm to 54 mm, for the first reaction zone, and from 38 mm to 54 mm, for the remaining part of the reactor depending on the ethylene based feed distribution. The reactor dimensions are selected to maintain a good process velocity of about 12 to 14 m/s. The pressure drop over the reactor is around 500 bar for all simulations. In all simulations, the side stream has been cooled down between 60° C. and 40° C., before feeding to the reactor resulting in a re-initiation temperature above 135° C.

Initiator systems comprising a mixture of multiple single initiators are injected into the reactor at different locations, to create multiple reaction zones, and thus creating a four peak temp. profile, and elevating the overall ethylene conversion. Typically mixtures of Tert Butyl peroxy-2-ethylhexanoate (TBPO) and Di-tert-butyl peroxide (DTBP) have been used; however with low start and/or reinitition temp. Tert Butyl peroxypivalate (TBPIV) was added or in case of a peak temp. of 270° C. or lower DTBP was replaced by Tert Butyl peracetate (TBPA). The pressurized water temperatures, for cooling or heating the reaction zones, are operated with an inlet temp. of 155° C., with the exemption of reaction zone 1 (including the preheating zone) which is operated at 190° C. All zones were simulated with a counter current cooling/heating configuration. Alternatively the pressurized water temperatures can be operated at other uniform or non-uniform settings. The cooling zones can be operated in a co- and/or countercurrent mode. The simulations have been done with an inlet temp. of the first reaction zone of 150° C.

Normalized Molecular Weight Distribution (MWD)

Molecular Weight Distribution (representing the relationship between (dw/dlog M) and log M) is an important parameter used in the polymerization designs, process development, improvement and operation. It is necessary to determine the types of polymer produced (narrow or broad MWD) which provide the desired product properties. Normalized MWD data can be obtained by using PREDICI commercial software package (licensed by Dr. M. Wulkow, Computing in Technology, GmbH, Pater-Klbe-Straβe 7, D-26180 Rastede, Germany), to construct MWD from polymerization kinetics (Goto kinetics in this study), through solving polymer population balance equations. The required inputs for PREDICI includes the used Goto kinetics, and the monomer and/or co-monomer, initiator and CTA flows, temperature and pressure profiles, as well as elapsed time, all of which can be obtained from the process simulation. PREDICI software package can be used to generate normalized MWD data. In this study, the MWD of each polymer has been calculated and subsequently normalized with the MWD of PE3 (100/0/0/0), following (Eqn.5).

$$MWD_{normalized} = \frac{MWD_{example}}{MWD_{PE3}} \times 100\%. \quad \text{(Eqn. 5)}$$

Polymerizations for Tubular Reactor: PE1 Through PE10

The simulations of polymers PE1 through PE10 have been done for the reactor configuration 100/0/0/0 (where the ethylene-based feed stream is fully sent to the first reaction zone). The inner tube diameter of the reactor is of 54 mm, giving an average process velocity of about 13 to 14 m/s over the whole reactor length. Depending on the desired MWD of polymer, the reactor inlet pressure is varied between 2400 bar (very broad MWD) to 3200 bar (very narrow MWD). In case of narrow MWD, as shown in PE2, PE6, PE8 and PE10, the reactor inlet pressure and the overall ethylene conversion level are maintained at respectively 3200 bar and at minimum ethylene conversion level of 28.2%. As shown in Tables 3 and 4, simulations were performed for products with a wide range of melt-index (0.2 to 10 MI) and with several CTA types. In the simulations for the 100/0/0/0 reactor configuration all CTA, make-up or recycled, is fed to the first reaction zone. The normalized Molecular Weight Distribution:

(*MWD*) is 100%, namely: $MWD_{normalized} = \dfrac{MWD_{Example}}{MWD_{PE3}} \times 100\% = 100\%.$ The MWD of PE3 is used to calculate the normalized MWD values reported in Table 5. In PE1, PE5, PE7 and PE9 ethylene is polymerized with the peak temperatures of 315, 315, 315 and 315° C. in four reaction zones and the pressure of 2400 bar for making very broad polymer. As can be clearly seen in Table 6, when using the same operating conditions (temp. and pressure), and PA as a CTA with activity (Cs) of 0.33, the corresponding normalized MWD (169%) is much lower than with MEK as CTA (Cs=0.06, normalized MWD=201%) and isobutane as CTA (Cs=0.0072, normalized MWD=261%). This impact was surprisingly not accompanied with significant variation in LCB content (LCBf is around 5.4/1000C). The very narrow MWD polymers, as named by PE2, PE4, PE6, PE8, PE10, have been simulated at a peak temperature of 230° C. for the first peak while the sequence peak temperatures have been adjusted to maintained a minimum ethylene conversion level of around 28.2% (see Table 4). The normalized MWD is below 100% for PA and MEK examples and just slightly above 100% for isobutane example. The final LCBf is decreased to around 2.09/1000 C. Additional simulations PE3 and PEA have been done at a constant pressure (2800 bar) and ethylene conversion level (31.9%). In PE3, the peak temperatures have been kept as 290, 290, 290 and 290° C. while in PEA, a lowering of the first peak temperature (240° C.) and adjusted three last peak temperatures have been applied to maintain the ethylene conversion at 31.9%. It is surprisingly found that lowering the first peak results in broader polymer (normalized MWD of 103% for PEA vs. 100% for PE3). It is also reflected in LCB content which is increased from 3.13/1000C (PE3) to 3.32/1000C (PEA).

Broad Polymerizations for Tubular Reactor: PEB11 to PEB18

PEB11 to PEB18 examples represent the high pressure reactor configuration with an ethylene based feed distribution of 50/50/0/0 over the reaction zones. The simulations were performed for products with varying MI from 0.2 to 10 g/10 min, and using different CTA activity (Cs is varying from 0.007 to 0.33). The PEB11, PEB12 and PEB13 indicate the simulations carried out at the peak temperatures between 290/290/290/290° C. to 296/296/296/296° C., while the pressure was varied from 2400 bar, 2800 bar to 3200 bar respectively with ethylene conversion level at 31.9%. A CTA with Cs=0.33 has been used for those simulations. It is noted that in those examples, (i) the make-up ethylene coming from the primary compressor is mainly distributed over the first reaction zone while (ii) recycled ethylene coming from the HPR and make-up CTA are distributed over the side of the reactor, resulting in low CTA concentration in the front of the reactor (Z1/Z2=0.45), thus making broad polymers at the specified ethylene conversion level (31.9% in this study). The effect of make-up ethylene and make-up CTA distributions is presented in Table 5 (see RFE2 and RFE3 for make-up ethylene effect and Z1/Z2 for CTA concentration effect). The influence of the pressure level on the polymer properties can be clearly seen at which a higher operating pressure resulting in significantly lower LCB level (MWD becomes narrower), see PEB11, PEB12 and PEB13.

In PEB14, very broad MWD product has been simulated under more extreme conditions, such as at the reaction peak temps. of 315, 315, 315 and 315° C., and the reactor inlet pressure of 2400 Bar, and thus the ethylene conversion is increased to 35.8%. Compared to the PEB11 to PEB13, PEB14 shows much broader MWD (normalized MWD is of 348% vs. 213%), and with significantly higher LCB level (5.26 vs. 3.891/1000C). The influence of melt-index and CTA types on the polymer properties have been studied in PEB15 through PEB18, which indicate that a lower MI will give broader normalized MWD, as compared to a higher MI (PEB16 vs. PEB15). Surprisingly the LCB of CP15 is much higher than PEB16 (4.96/1000C vs. 5.68/1000C). Also, the polymer made using a lower CTA activity, for instance i-C4 (Cs=0.007), is much broader than a polymer made with MEK (Cs=0.06) or PA (Cs=0.33), as shown in PEB14, PEB17 and PEB18. It is surprisingly that, despite of significantly broader MWD of polymer made with i-C4 (normalized MWD is 488%) than polymer made with PA (normalized MWD of 348%), the final LCB level for the polymers still remained very close (5.37/1000C for i-C4 vs. 5.26/1000C for PA), see Table 5 for simulated polymer properties.

Broad Polyms. for Tubular Reactor: PEB19 Through PEB23, PEB19.1 and PEB19.2.—

The process conditions and product properties of PEB19 through PEB23 have been simulated for the ethylene based feed distribution of 25/25/50/0. In those examples, which are similar to the PEB11 through PEB18, the make-up ethylene coming from the primary compressor is distributed over the first reaction zone of the reactor while the recycled ethylene coming from the HPR and the CTA (make up and recycle) is distributed over the side of the reactor for making very broad MWD. It thus results in the low CTA feed concs. in the first reaction zone (see Table 5). Note that PEB19 has been carried out at the process conditions 290, 290, 290, 290° C. and 2800 bar and at a constant ethylene conversion of 31.9%, while other simulation have been done with more extreme conditions to make very broad MWD, thus resulting in higher conversion. Also, PEB19.1 and PEB19.2 indicate the polymerization with even CTA distribution to the front and side of the reactor (Z1/Zi=1) to establish the lower limit of the MWD range, see the lower curves of "MWD vs. ethylene based feed distribution," as plotted in FIGS. 7 and 8. The peak temperatures of 315/315/315/315° C. and 293/293/293/293° C. were applied for PEB19.1 and PEB19.2, showing the ethylene conversion of 35.6% and 31.9% respectively. Also the polymers made by different CTA's have also been studied. It is also investigated that the reactor configuration with higher number of ethylene based feed distribution results in broader normalized MWD when operated at the same reactor inlet pressure and reaction peak temp. (see 25/25/50/0 vs. 50/50/0/0 reactor configurations), indicating broader MWD capability. The SCB levels for making narrow and broad MWD polymers, varying between 18 to 30 (1/1000 C), resulting in the product density in the range from 0.915 to 0.933 g/cm$^3$.

Inventive Polymerization PEN11 Through PEN18

The inventive polymers have been simulated using different reactor configurations and operation conditions, as well as other important process parameters, such as make-up ethylene and/or make-up CTA distribution (see Table 3 and Table 4 for more detail). PEN11 through PEN13 (ethylene based feed distribution 50/50/0/0) have been carried out at the pressure level of 2400, 2800 and 3200 bar, with lowering the first peak temperature to 240° C., while the remaining peak temperatures are adjusted to maintain the ethylene conversion level at 31.9%. In contrast to the PEB examples, in these simulations make-up ethylene coming from the primary compressor is mainly sent to the side of the reactor, while recycled ethylene coming from the HPR and fresh/make-up CTA are preferably sent to first reaction zone, resulting in high CTA conc. in the front of the reactor (see Table 4) to control melt index, thus making narrow polymers at a certain ethylene conversion level. As seen in Table 5, PEN11 through PEN13 shown much lower normalized MWD level than the broad polymer PEB11 though PEB13 cases. Surprisingly at the same pressure and ethylene conversion level, as seen in PEB11 vs. PEN11, PEB12 vs. PEN12 and PEB13 vs. PEN13, even though the resins are significantly narrower (with much higher product density as indicated by lower SCB number); the LCB level is at the same level. Similar effect has been obtained for IP19 example (ethylene based feed distribution of 25/25/50/0). The polymers can be further narrowed by lowering peak temperatures and applying a higher pressure level (3200 bar for instance), as shown in IP14 and IP19, in which ethylene conversion is maintained at a min. level of 28.2%. Additional simulations have been done to cover the effect of melt-index and CTA types on the polymer properties—shown in PEN15 through PEN18 and PEN21 through PEN23. The narrower MWD polymer is made with higher melt-index and using CTA with higher activity.

Molecular Weight Distribution Product Capability—

Figure 7:
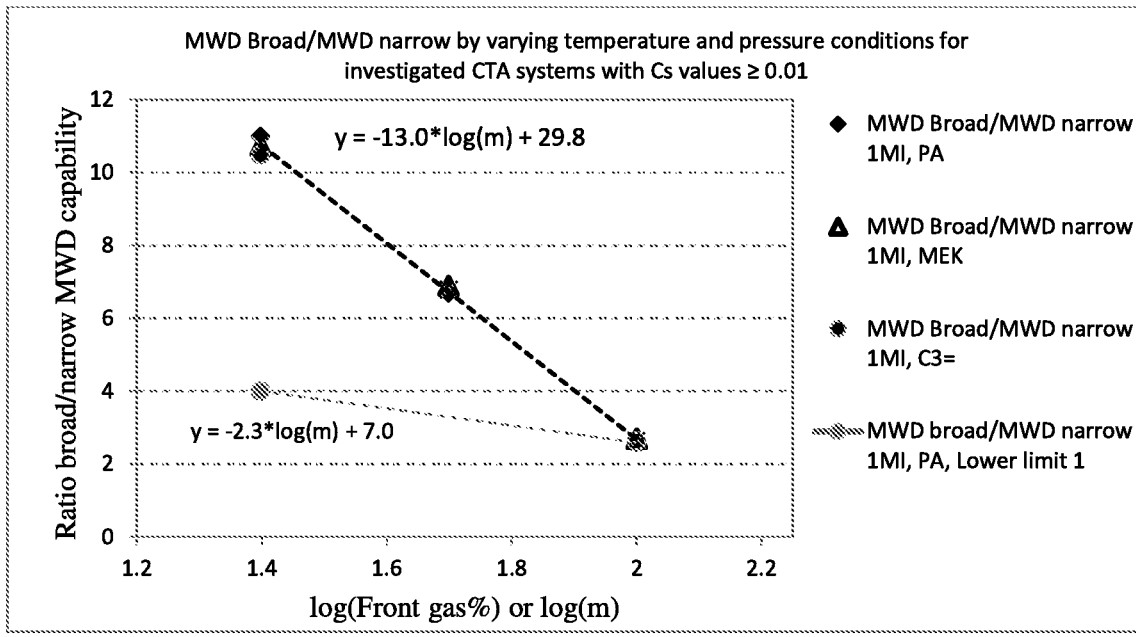
FIG. 7 depicts the ratio of the broad/narrow MWD capability as a function of percentage front gas expressed as log(m) (see claim 1).

The relationship between the MWD ratio of the very broad and very narrow MWD polymers, as a function of ethylene based feed flow to the front of the reactor is plotted in FIG. 7. As can be seen, a lowering of the ethylene based feed flow sent to the front of the reactor broadens the MWD product capability. It is found that, the CTA system plays an important impact on the MWD ratio, for instance, a CTA system with a lower Cs value will increase the MWD. Surprisingly the MWD ratio between broad and narrow MWD products is strongly affected when CTA systems with different Cs values are applied. This influence on the MWD ratio can be reflected by following factor: the normalized MWD capacity as described by (Eqn. a):

$$(0.1*\ln(Cs_{narrow\ MWD\ process}/Cs_{broad\ MWD\ process})+1)*(-2.3*\log(m)+7) \le Q \le (0.1*\ln(Cs_{narrow\ MWD\ process}/Cs_{broad\ MWD\ process})+1)*(-13.0*\log(m)+29.8) \quad \text{(Eqn. a)};$$

wherein $T=(0.1*\ln(Cs_{narrow\ MWD\ process}/Cs_{broad\ MWD\ process})+1)$.

The lower limit for the ratio between broad and narrow MWD capability reflects the current MWD capability as function of CTA choice and percentage of total ethylene-based feed flow sent to the first reaction zone, while the upper limit reflects the maximum ratio between broad and narrow MWD capability by the inventive operation. The values between the lower and upper limit reflects the inventive operating space as shown in Equation (a). Further detail on the process conditions, see Tables 3 and 4. The data used in Eqn. a, and plotted in FIG. 7, can be found in Table 6a, b and c. Moreover, when the train is operated at a constant ethylene conversion level, the calculation of the MWD broad and MWD narrow ratios (Y) obtained from simulated polymers for each reactor configuration has been reported and compared to the high and low limit values in Equation (b). The data to build the equation and simulated test cases to validate the equation have been reported in Tables 7a and 7b, and plotted in FIG. 8.

$$(0.1*\ln(Cs_{narrow\ MWD\ process}/Cs_{broad\ MWD\ process})+1)*(-1.1\times\log(m)+3) \le Y \le (0.1*\ln(Cs_{narrow\ MWD\ process}/Cs_{broad\ MWD\ process})+1)*(-6.23\times\log(m)+13.5) \quad \text{(Eqn. b)}$$

Figure 8:
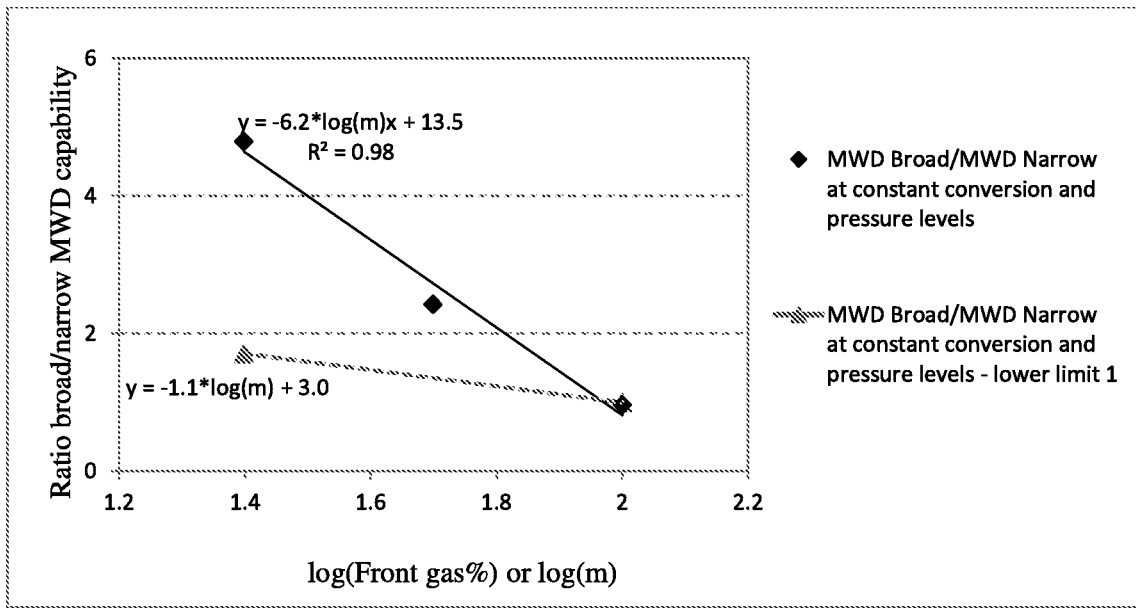
FIG. 8 depicts the ratio of broad versus narrow MWD capability as function of percentage of front gas expressed as log(m) (see claim 3).
Figure 9:
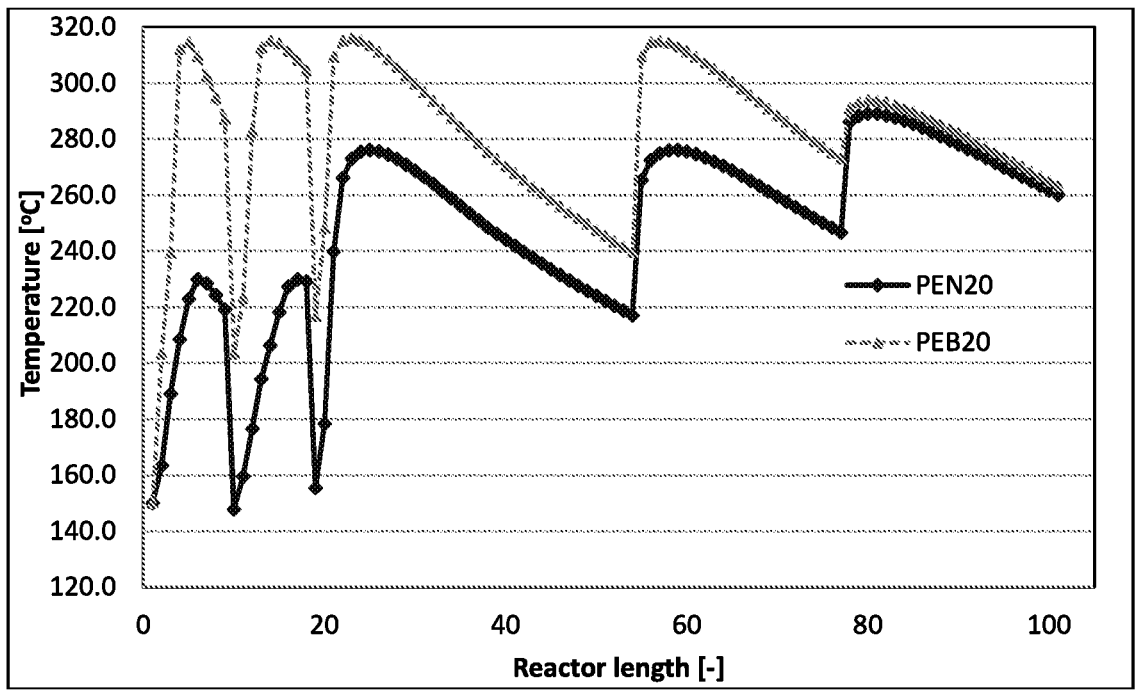
FIG. 9 depicts temperature profiles of PEN20 (narrow MWD) and PEB20 (broad MWD).
Figure 10:
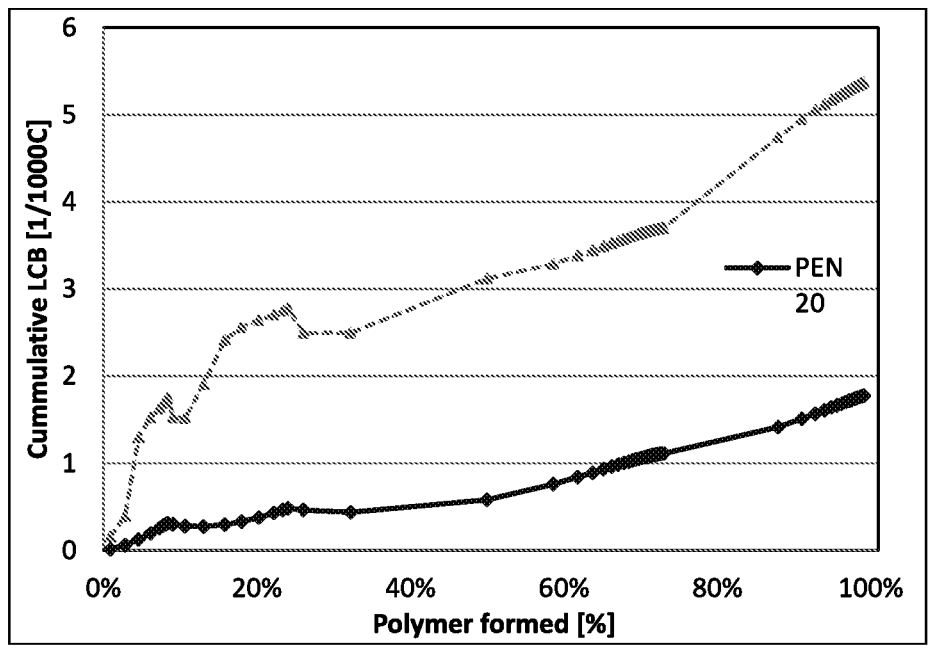
FIG. 10 depicts LCB as a function of polymer formed along the reactor for PEN20 and PEB20.

In addition, the influence of the reactor inlet pressure on the broad and narrow MWD ratio at a constant ethylene conversion level has also been described by Eqn. (C) and calculated in Table 8.

$$\left\{(0.1*\ln(Cs_{narrow\ MWD\ process}/Cs_{broad\ MWD\ process})\times \right. \quad \text{(Eqn. C)}$$
$$(-1.1\times\log(m)+3.0))*\left[\left(1-0.115*\frac{P_B-P_N}{400\ Bar}\right)\right]\le$$
$$W \le \left\{(0.1*\ln(Cs_{narrow\ MWD\ process}/Cs_{broad\ MWD\ process})\times\right.$$
$$\left.(-6.23\times\log(m)+13.5)*\left[\left(1-0.115*\frac{P_B-P_N}{400\ Bar}\right)\right]\right\};$$

where $P_B$ and $P_N$ are the reactor inlet pressure used when making broad and narrow MWD, respectively. As shown in FIG. 7 and FIG. 8, the operation of the train at a constant ethylene conversion level will result in narrower product capability (ratio between broad and narrow MWD) than when operating at varying ethylene conversion levels. It has also been found that that by a) sending less ethylene to the first reaction zone, b) increasing the flow and/or the number of feed streams at the side of the reactor, and/or c) varying the operating conditions can be used to expand the MWD capability of a tubular reactor configuration.

Summary—

The impact of the ethylene-based split ratio (percentage of ethylene sent to the front of the reactor) and process conditions (pressure, temperature, selection of CTA system and distribution of make-up ethylene and/or make-up CTA) on the product properties (represented by normalized MWD, LCBf) have been investigated. The inventive polymerization allows the production of narrow and broad MWD polymers at high ethylene conversion. For example, (i) at a constant ethylene conversion level, at reactor configurations using a distribution of the overall ethylene based feed over the front reaction zone and side reaction zone(s); by varying the inlet pressure, and operating all peak temperatures at a constant high level, will broaden the MWD capability. The effect of CTA system, pressure level, make-up CTA and make-up ethylene distributions has also been inventively applied to maximize and improve product capability of a tubular train. It has also been discovered that a reactor with ≥3 ethylene feed s will result in broader MWD product capability, as compared to a reactor with two ethylene feeds and/or sending more overall ethylene-based feed stream to front reaction zone. It has been discovered that the production of LDPE with multiple (≥2) ethylene based feeds, and the application of inventive operating conditions, including low peak temperature(s) in the first, second or third reaction zones, enables the production of narrow and broad MWD polymers, at constant and/or high ethylene conversion levels. Furthermore, it has been surprisingly discovered that narrow MWD polymers can be produced at high ethylene conversion level, and low operating pressure, by applying low peak temperature(s) in the first, second or third reaction zones, and distributing the make-up ethylene primarily to the side of the reactor, and/or distributing the make-up CTA primarily to the first and/or second reaction zones and selecting CTA systems with different Cs value.

TABLE 3

Process Configurations and Operating Conditions

| Ethylene based feed distribution | Ex. | Temp. of the side ethylene based feed [° C.] | Peak temp. in each rnx zone [° C.] | Start/re-initiation temp. of each rnx zone [° C.] | Ethylene conversion % | Reactor inlet press. Bar |
|---|---|---|---|---|---|---|
| Total reactor length 1408 (m) and reactor inside diameter 54 (mm) with ethylene throughput of 60 tons/hr | | | | | | |
| 100/0/0/0 | PE1 | NA | 315/315/315/315 | 150/262/270/281 | 35.9 | 2400 |
| | PE2 | NA | 230/276/276/276 | 150/206/245/251 | 28.2 | 3200 |
| | PE3 | NA | 290/290/290/290 | 150/251/253/262 | 31.9 | 2800 |
| | PE4 | NA | 240/302/302/302 | 150/211/263/270 | 31.9 | 2800 |
| | PE5 | NA | 315/315/315/315 | 150/263/270/280 | 35.8 | 2400 |
| | PE6 | NA | 230/278/278/278 | 150/207/246/252 | 28.2 | 3200 |
| | PE5.1 | NA | 292/292/292/292 | 150/253/247/258 | 31.9 | 2400 |
| | PE6.1 | NA | 291/291/291/291 | 150/261/260/269 | 31.9 | 3200 |
| | PE7 | NA | 315/315/315/315 | 150/263/270/280 | 35.7 | 2400 |
| | PE8 | NA | 230/278/278/278 | 150/207/247/252 | 28.2 | 3200 |
| | PE9 | NA | 315/315/315/315 | 150/264/270/280 | 35.4 | 2400 |
| | PE10 | NA | 230/282/282/282 | 150/208/250/255 | 28.2 | 3200 |
| Total reactor length 1272 (m) and reactor inside diameter 38/54/54/54 (mm) with ethylene throughput of 60 tons/hr | | | | | | |
| 50/50/0/0 | PEB11 | 40 | 293/293/293/293 | 150/168/253/254 | 31.9 | 2400 |
| | PEN11 | 60 | 240/297/297/297 | 150/138/258/256 | 31.9 | 2400 |
| | PEB12 | 40 | 290/290/290/290 | 150/168/253/258 | 31.9 | 2800 |
| | PEN12 | 60 | 240/295/295/295 | 150/140/289/261 | 31.9 | 2800 |
| | PEB13 | 40 | 296/296/296/296 | 150/173/271/269 | 31.9 | 3200 |
| | PEN13 | 60 | 240/297/297/297 | 150/142/273/269 | 31.9 | 3200 |
| | PEB14 | 40 | 315/315/315/315 | 150/182/262/276 | 35.3 | 2400 |
| | PEN14 | 60 | 230/270/270/270 | 150/144/233/242 | 28.2 | 3200 |
| | PEB15 | 40 | 315/315/315/315 | 150/180/250/264 | 38.1 | 2400 |
| | PEN15 | 60 | 230/261/261/261 | 150/144/234/243 | 28.2 | 3200 |
| | PEB16 | 40 | 315/315/315/315 | 150/183/271/283 | 33.4 | 2400 |
| | PEN16 | 60 | 230/280/280/280 | 150/145/248/258 | 28.2 | 3200 |
| | PEB17 | 40 | 315/315/315/315 | 150/182/263/276 | 35.2 | 2400 |
| | PEN117 | 60 | 230/271/271/271 | 150/144/234/243 | 28.2 | 3200 |
| | PEB18 | 40 | 315/315/315/315 | 150/182/263/275 | 34.9 | 2400 |
| | PEN18 | 60 | 230/274/274/274 | 150/144/238/246 | 28.2 | 3200 |
| Total reactor length 1289 (m) and reactor inside diameter 27/38/54/54 (mm) with ethylene throughput of 60 tons/hr | | | | | | |
| 25/25/50/0 | PEB19 | 40 | 290/290/290/290 | 150/165/168/231 | 31.9 | 2800 |
| | PEN19 | 40 | 240/240/300/300 | 150/139/140/238 | 31.9 | 2800 |
| | PEB19.1 | 40 (EVEN CTA) | 315/315/315/315 | 150/161/177/239 | 35.6 | 2400 |
| | PEN19.1 | 60 | 267/267/267/267 | 150/151/158/242 | 28.2 | 3200 |
| | PEB19.2 | 40 (EVEN CTA) | 293/293/293/293 | 150/161/172/226 | 31.9 | 2400 |
| | PEN19.2 | 40 | 287/287/287/287 | 150/154/168/242 | 31.9 | 3200 |
| | PEB20 | 40 | 315/315/315/315 | 150/169/179/240 | 34.9 | 2400 |
| | PEN20 | 60 | 230/230/276/276 | 150/141/147/217 | 28.2 | 3200 |
| | PEB21 | 40 | 315/315/315/315 | 150/169/179/240 | 34.9 | 2400 |
| | PEN21 | 60 | 230/230/276/276 | 150/142/147/214 | 28.2 | 3200 |
| | PEB22 | 40 | 315/315/315/315 | 150/169/179/240 | 34.7 | 2400 |
| | PEN22 | 60 | 230/230/273/273 | 150/141/147/218 | 28.2 | 3200 |
| | PEB23 | 40 | 315/315/315/315 | 150/169/178/239 | 34.6 | 2400 |
| | PEN23 | 60 | 230/230/281/281 | 150/142/147/221 | 28.2 | 3200 |

TABLE 4

Make-up Ethylene Distrib. and CTA Properties and Distrib. - Comp. and Inv.

| Ethylene feed distrib. | Ex. | MI dg/min | Cs | FE1 | FE2 | FE3 | RFE2 | RFE3 | Z1/Z2 | Z1/Z3 |
|---|---|---|---|---|---|---|---|---|---|---|
| 100/0/0/0 | PE1 | 1.0 | 0.33 | 0.4 | NA | NA | NA | NA | NA | NA |
| | PE2 | 1.0 | 0.33 | 0.3 | NA | NA | NA | NA | NA | NA |
| | PE3 | 1.0 | 0.33 | 0.3 | NA | NA | NA | NA | NA | NA |
| | PE4 | 1.0 | 0.33 | 0.3 | NA | NA | NA | NA | NA | NA |
| | PE5 | 1.0 | 0.06 | 0.4 | NA | NA | NA | NA | NA | NA |
| | PE6 | 1.0 | 0.06 | 0.3 | NA | NA | NA | NA | NA | NA |
| | PE5.1 | 1.0 | 0.33 | 0.3 | NA | NA | NA | NA | NA | NA |
| | PE6.1 | 1.0 | 0.33 | 0.3 | NA | NA | NA | NA | NA | NA |
| | PE7 | 1.0 | 0.012 | 0.4 | NA | NA | NA | NA | NA | NA |
| | PE8 | 1.0 | 0.012 | 0.3 | NA | NA | NA | NA | NA | NA |
| | PE9 | 1.0 | 0.0072 | 0.4 | NA | NA | NA | NA | NA | NA |
| | PE10 | 1.0 | 0.0072 | 0.3 | NA | NA | NA | NA | NA | NA |
| 50/50/0/0 | PEB11 | 1.0 | 0.33 | 0.7 | 0 | NA | Infinite | NA | 0.45 | NA |
| | PEN11 | 1.0 | 0.33 | 0 | 0.7 | NA | 0 | NA | 1.55 | NA |

TABLE 4-continued

Make-up Ethylene Distrib. and CTA Properties and Distrib. - Comp. and Inv.

| Ethylene feed distrib. | Ex. | MI dg/min | Cs | FE1 | FE2 | FE3 | RFE2 | RFE3 | Z1/Z2 | Z1/Z3 |
|---|---|---|---|---|---|---|---|---|---|---|
| | PEB12 | 1.0 | 0.33 | 0.7 | 0 | NA | Infinite | NA | 0.45 | NA |
| | PEN12 | 1.0 | 0.33 | 0 | 0.7 | NA | 0 | NA | 1.55 | NA |
| | PEB13 | 1.0 | 0.33 | 0.7 | 0 | NA | Infinite | NA | 0.45 | NA |
| | PEN13 | 1.0 | 0.33 | 0 | 0.7 | NA | 0 | NA | 1.55 | NA |
| | PEB14 | 1.0 | 0.33 | 0.7 | 0 | NA | Infinite | NA | 0.45 | NA |
| | PEN14 | 1.0 | 0.33 | 0 | 0.6 | NA | 0 | NA | 1.55 | NA |
| | PEB15 | 10.0 | 0.33 | 0.8 | 0 | NA | Infinite | NA | 0.45 | NA |
| | PEN15 | 10.0 | 0.33 | 0 | 0.6 | NA | 0 | NA | 1.55 | NA |
| | PEB16 | 0.2 | 0.33 | 0.7 | 0 | NA | Infinite | NA | 0.45 | NA |
| | PEN16 | 0.2 | 0.33 | 0 | 0.6 | NA | 0 | NA | 1.55 | NA |
| | PEB17 | 1.0 | 0.06 | 0.7 | 0 | NA | Infinite | NA | 0.47 | NA |
| | PEN17 | 1.0 | 0.06 | 0 | 0.6 | NA | 0 | NA | 1.53 | NA |
| | PEB18 | 1.0 | 0.0072 | 0.7 | 0 | NA | Infinite | NA | 0.48 | NA |
| | PEN18 | 1.0 | 0.0072 | 0 | 0.6 | NA | 0 | NA | 1.52 | NA |
| 25/25/50/0 | PEB19 | 1.0 | 0.33 | 0.8 | 0.5 | 0 | 1.6 | Infinite | 0.5 | 0.22 |
| | PEN19 | 1.0 | 0.33 | 0 | 0 | 0.7 | NA | 0 | 1.07 | 1.68 |
| | PEB19.1 | 1.0 | 0.33 | 0.4 | 0.4 | 0.4 | 1.3 | Infinite | 1 | 1 |
| | PEN19.1 | 1.0 | 0.33 | 0 | 0 | 0.6 | NA | 0 | 1.28 | 1.48 |
| | PEB19.2 | 1.0 | 0.33 | 0.4 | 0.4 | 0.4 | 1 | 1 | 1 | 1 |
| | PEN19.2 | 1.0 | 0.33 | 0 | 0 | 0.7 | NA | 0 | 1.28 | 1.48 |
| | PEB20 | 1.0 | 0.33 | 0.8 | 0.6 | 0 | 1 | 1 | 0.5 | 0.22 |
| | PEN20 | 1.0 | 0.33 | 0 | 0 | 0.7 | NA | 0 | 1.07 | 1.68 |
| | PEB21 | 1.0 | 0.06 | 0.8 | 0.6 | 0 | 1.3 | Infinite | 0.48 | 0.22 |
| | PEN21 | 1.0 | 0.06 | 0 | 0 | 0.6 | NA | 0 | 1.04 | 1.59 |
| | PEB22 | 1.0 | 0.012 | 0.8 | 0.6 | 0 | 1.3 | Infinite | 0.53 | 0.22 |
| | PEN22 | 1.0 | 0.012 | 0 | 0 | 0.6 | NA | 0 | 1.19 | 1.88 |
| | PEB23 | 1.0 | 0.0072 | 0.8 | 0.6 | 0 | 1.3 | Infinite | 0.47 | 0.22 |
| | PEN23 | 1.0 | 0.0072 | 0 | 0 | 0.6 | NA | 0 | 1.01 | 1.54 |

B) Z1/Z2 is the ratio of the activity of the CTA system in the first ethylene feed (Z1) to the activity of the CTA system in the second ethylene feed (Z2).
C) Z1/Z3 is the ratio of the activity of the CTA system in the first ethylene feed (Z1) to the activity of the CTA system in the third ethylene feed (Z3).
The RZ1, RZ2 and RZ3 are calculated with the assumptions that the about 60% ethylene based feed is come from the high pressure recycle (HPR) flow. The rest of the about 40 wt % ethylene based feed is from primary which includes make-up ethylene and low pressure recycle (LPR) flow. Make-up (fresh) ethylene is 33.3 mol % which includes ethylene converted and lost by purge flow. Thus the LPR flow is 6.7 mol % which includes ethylene from LPR and secondary compressor gland leaks.

TABLE 5

Predicted product properties for comparative and inventive examples

| Ethylene based feed distribution | Example | LCB 1/1000 C | SCB 1/1000 C | Mw/Mn | Mw/Mn normalized % |
|---|---|---|---|---|---|
| 100/0/0/0 | PE1 | 5.35 | 28 | 13.6 | 169 |
| | PE2 | 1.89 | 19 | 5.2 | 65 |
| | PE3 | 3.13 | 23 | 8.1 | 100 |
| | PE4 | 3.32 | 23 | 8.3 | 103 |
| | PE5 | 5.35 | 28 | 16.2 | 201 |
| | PE6 | 1.93 | 19 | 6 | 75 |
| | PE5.1 | 3.86 | 25 | 9.32 | 116 |
| | PE6.1 | 2.61 | 21 | 7.37 | 92 |
| | PE7 | 5.4 | 30 | 18.8 | 233 |
| | PE8 | 1.99 | 24 | 7.1 | 89 |
| | PE9 | 5.44 | 28 | 21 | 261 |
| | PE10 | 2.15 | 21 | 8.8 | 109 |
| 50/50/0/0 | PEB11 | 3.89 | 25 | 17.2 | 213 |
| | PEN11 | 3.83 | 24 | 7.5 | 93 |
| | PEB12 | 3.22 | 23 | 15.8 | 196 |
| | PEN12 | 3.1 | 22 | 6.5 | 81 |
| | PEB13 | 2.71 | 21 | 13.9 | 173 |
| | PEN13 | 2.6 | 20 | 5.8 | 72 |
| | PEB14 | 5.26 | 27 | 28 | 348 |
| | PEN14 | 1.77 | 18 | 4.2 | 52 |
| | PEB15 | 5.68 | 28 | 23.2 | 288 |
| | PEN15 | 2.02 | 20 | 3.6 | 44 |
| | PEB16 | 4.96 | 27 | 31.2 | 388 |
| | PEN16 | 1.95 | 19 | 5.3 | 66 |
| | PEB17 | 5.25 | 27 | 32 | 398 |
| | PEN117 | 1.77 | 18 | 4.7 | 58 |
| | PEB18 | 5.37 | 28 | 39.3 | 488 |
| | PEN18 | 1.98 | 20 | 6.6 | 82 |
| 25/25/50/0 | PEB19 | 3.43 | 23 | 33.6 | 417 |
| | PEN19 | 3.09 | 22 | 7 | 87 |
| | PEB19.1 | 5.45 | 27 | 24.5 | 305 |
| | PEN19.1 | 1.85 | 18 | 5.4 | 67 |
| | PEB19.2 | 4.00 | 25 | 15.8 | 197 |
| | PEN19.2 | 2.61 | 20 | 8.1 | 101 |
| | PEB20 | 5.41 | 27 | 46.4 | 577 |
| | PEN20 | 1.75 | 18 | 4 | 50 |
| | PEB21 | 5.41 | 27 | 50.3 | 624 |
| | PEN21 | 1.8 | 18 | 4.7 | 58 |
| | PEB22 | 5.48 | 30 | 54.5 | 677 |
| | PEN22 | 1.89 | 24 | 5.2 | 65 |
| | PEB23 | 5.56 | 28 | 57.4 | 713 |
| | PEN23 | 2.01 | 20 | 7 | 87 |

TABLE 6a

Ratio of broad MWD vs. narrow MWD, The data lines with $Cs_{narrow\ MWD\ process}/Cs_{broad\ MWD\ process} = 1$ are used in FIG. 7. RX1 is the first rnx zone

| Ethylene based feed distribution to RX1 (m*) | Broad MWD example/ Narrow MWD example | $Cs_{narrow\ MWD\ process}/Cs_{broad\ MWD\ process}$ | log(m) | T | (T) × [−2.3 × log(m) + 7.0] | Q | (T) × [−13.0 × log(m) + 29.8] |
|---|---|---|---|---|---|---|---|
| 100 | PE1/PE2 | 1.0 | 2 | 1.0 | 2.4 | 2.6 | 3.8 |
| 100 | PE5/PE6 | 1.0 | 2 | 1.0 | 2.4 | 2.7 | 3.8 |
| 100 | PE7/PE8 | 1.0 | 2 | 1.0 | 2.4 | 2.6 | 3.8 |
| 100 | PE9/PE10 | 1.0 | 2 | 1.0 | 2.4 | 2.4 | 3.8 |
| 50 | PEB14/PEN14 | 1.0 | 1.70 | 1.0 | 3.1 | 6.7 | 7.7 |
| 50 | PEB 17/PEN17 | 1.0 | 1.70 | 1.0 | 3.1 | 6.9 | 7.7 |
| 50 | PEB 18/PEN18 | 1.0 | 1.70 | 1.0 | 3.1 | 5.9 | 7.7 |
| 25 | PEB20/PEN20 | 1.0 | 1.40 | 1.0 | 3.8 | 11.5 | 11.7 |
| 25 | PEB21/PEN21 | 1.0 | 1.40 | 1.0 | 3.8 | 10.7 | 11.7 |
| 25 | PEB22/PEN22 | 1.0 | 1.40 | 1.0 | 3.8 | 10.5 | 11.7 |
| 25 | PEB23/PEN23 | 1.0 | 1.40 | 1.0 | 3.8 | 8.2 | 11.7 |

*m = mol % of ethylene-based feed to the first reaction zone (based on the total moles of ethylene based feed fed to the reactor).

TABLE 6b

Ratio of broad MWD vs. narrow MWD-the data lines with $Cs_{narrow\ MWD\ process}/Cs_{broad\ MWD\ process} = 1$ are used in FIG. 7.

| Ethylene based feed distribution to RX1 (m)* | Broad MWD example/Narrow MWD example | $Cs_{narrow\ MWD\ process}/Cs_{broad\ MWD\ process}$ | T | (T) × [−2.3 × log(m) + 7.0] | Q |
|---|---|---|---|---|---|
| 100 | PE5.1/PE6.1 | 1.0 | 1.0 | 2.4 | 2.5 |
| 25 | PEB19.1/PEN19.1 | 1.0 | 1.0 | 3.8 | 4.6 |

*m = mol % of ethylene-based feed to the first reaction zone (based on the total moles of ethylene based feed fed to the reactor).

TABLE 6c

Ratio of broad MWD vs. narrow MWD for different $Cs_{narrow\ MWD\ process}/Cs_{broad\ MWD\ process}$, $T = (0.1 \ast \ln(Cs_{narrow\ MWD\ process}/Cs_{broad\ MWD\ process}) + 1)$ which reflects the effect the activity of CTA system at the outlet of the reactor system.

| Ethylene based feed distribution to RX1 (m)* | Broad MWD ex./ Narrow MWD ex. | $Cs_{narrow\ MWD\ process}/Cs_{broad\ MWD\ process}$ | T | (T) × [−2.3 × log(m) + 8.0] | Q | (T) × [−13.0 × log(m) + 29.8] |
|---|---|---|---|---|---|---|
| 100 | PE1/PE10 | 0.021 | 0.61 | 1.5 | 1.6 | 2.3 |
| 50 | PEB14/PEN18 | 0.021 | 0.61 | 1.9 | 4.2 | 4.7 |
| 25 | PEB20/ PEN23 | 0.021 | 0.61 | 2.3 | 6.6 | 7.1 |
| 100 | PE9/PE2 | 47.1 | 1.39 | 3.3 | 4.0 | 5.2 |
| 50 | PEB 18/PEN14 | 47.1 | 1.39 | 4.3 | 9.4 | 10.7 |
| 25 | PEB 23/PEN20 | 47.1 | 1.39 | 5.3 | 14.2 | 16.1 |

*m = mol % of ethylene-based feed to the first reaction zone (based on the total moles of ethylene based feed fed to the reactor).

TABLE 7a

Ratio broad MWD vs. narrow MWD - .the data lines with $Cs_{narrow\ MWD\ process}/Cs_{broad\ MWD\ process} = 1$ at a constant ethylene conversion level are used in FIG. 8.

| Ethylene based feed distribution to RX1 m* | Broad MWD example/ Narrow MWD example | $Cs_{narrow\ MWD\ process}/Cs_{broad\ MWD\ process}$ | T | (T) × [−1.1 × log(m) + 3.0] | Y | (T) × [−6.2 × log(m) + 13.5] |
|---|---|---|---|---|---|---|
| 100 | PE3/PE4 | 1 | 1 | 0.8 | 0.97 | 1.1 |
| 50 | PEB12/PEN12 | 1 | 1 | 1.1 | 2.4 | 3.0 |
| 25 | PEB19/PEN19 | 1 | 1 | 1.5 | 4.79 | 4.83 |

*m = mol % of ethylene-based feed to the first reaction zone (based on the total moles of ethylene based feed fed to the reactor).

TABLE 7b

Ratio broad MWD vs. narrow MWD (for lower limit)-the data lines with $Cs_{narrow\ MWD\ process}/Cs_{broad\ MWD\ process} = 1$ at a constant ethylene conversion level are used in FIG. 8.

| Ethylene based feed distribution to RX1 m* | Broad MWD/ Narrow MWD example | $Cs_{narrow\ MWD\ process}/Cs_{broad\ MWD\ process}$ | T | (T) × [-1.1 × log(m) + 3.0] | Y |
|---|---|---|---|---|---|
| 100 | PE3/PE4 | 1 | 1.00 | 0.8 | 0.97 |
| 50 | PEB19.2/PEN19.2 | 1 | 1.00 | 1.46 | 1.95 |

*m = mol % of ethylene-based feed to the first reaction zone (based on the total moles of ethylene based feed fed to the reactor).

TABLE 8

Ratio broad MWD vs. narrow MWD with $Cs_N/Cs_B = 1$ as function of varying reactor inlet pressure and constant ethylene conversion level.

| Ethylene based feed distribution to RX1 m* | Broad MWD example/ Narrow MWD example | $Cs_{narrow\ MWD\ process}/Cs_{broad\ MWD\ process}$ | T | $[(T) \times (-1.1 \times \log(m) + 3.0)] \times [(1 - 0.115 * (\frac{P_B - P_N}{400}))]$ | W | $[(T) \times (-6.23 \times \log(m) + 13.5)] \times [(1 - 0.115 * (\frac{P_B - P_N}{400}))]$ | $P_B$ | $P_N$ |
|---|---|---|---|---|---|---|---|---|
| 50 | PEB11/PEN13 | 1 | 1 | 1.4 | 2.94 | 3.62 | 2400 | 3200 |
| 50 | PEB12/PEN13 | 1 | 1 | 1.3 | 2.71 | 3.28 | 2800 | 3200 |
| 50 | PEB13/PEN13 | 1 | 1 | 1.1 | 2.39 | 2.95 | 3200 | 3200 |

*m = mol % of ethylene-based feed to the first reaction zone (based on the total moles of ethylene based feed fed to the reactor).

The invention claimed is:

1. A process to form an ethylene-based polymer, said process comprising polymerizing a mixture comprising ethylene, in the presence of at least one free-radical initiator, and in a tubular reactor system comprising at least two ethylene-based feed streams, and a reactor configuration that comprises at least three reaction zones; and
wherein the inlet pressure of the first reaction zone is less than, or equal to, 3200 Bar; and the polymerization has an ethylene conversion ≥28%, and an m value from 20 mole % to 70 mole %, where m=mol % of ethylene-based feed stream to the first reaction zone, based on the total moles of ethylene-based feed streams fed to the reactor configuration; and
wherein the ratio (Q) of a "$MWD_B$ of a broad polymer" polymerized, to a "$MWD_N$ of a narrow polymer" polymerized, is as follows: $\{(T)*(-2.3 \times \log(m)+7)\} \leq Q \leq \{(T)*(-13.0 \times \log(m)+29.8)\}$; and wherein the "$MWD_B$ polymer" and the "$MWD_N$ polymer" both have the same melt index; and wherein the "T" is the "chain transfer activity ratio" and "T" is from 0.6 to 1.6, and T is defined as follows: $T=\{[0.1*\ln(Cs_{narrow\ MWD\ process}/Cs_{broad\ MWD\ process})]+1\}$; wherein $Cs_{narrow\ MWD\ process}$ and $Cs_{broad\ MWD\ process}$ are average Cs values of the CTA system at the outlet of the reactor configuration used to produce, respectively, the narrow and the broad MWD polymers, and wherein $MWD_B > MWD_N$.

2. A process to form an ethylene-based polymer, said process comprising polymerizing a mixture comprising ethylene, in the presence of at least one free-radical initiator, and in a tubular reactor system comprising at least two ethylene-based feed streams, and a reactor configuration that comprises at least three reaction zones; and
wherein the inlet pressure of the first reaction zone is less than, or equal to, 3200 Bar; and the polymerization has an ethylene conversion >28%, and an m value from 20 mole % to 70 mole %, where m=mol % of ethylene-based feed stream to the first reaction zone, based on the total moles of ethylene-based feed streams fed to the reactor configuration; and
wherein the ratio (W) of a "$MWD_B$ of a broad polymer polymerized", to the "$MWD_N$ of a narrow polymer polymerized", is as follows:

$$\{[(T) \times (-1.1 \times \log(m) + 3.0)] * [(1 - 0.115 * \frac{P_B - P_N}{400\ \text{Bar}})]\} \leq$$
$$W \leq \{[(T) * (-6.2 * \log(m) + 13.5)] * [(1 - 0.115 * \frac{P_B - P_N}{400\ \text{Bar}})]\};$$

where $P_B$ is the inlet pressure for the "$MWD_B$ broad polymer;" $P_N$ is the inlet pressure for the "$MWD_N$ polymer;" and wherein the "$MWD_B$ polymer" and the "$MWD_N$ polymer" both have the same melt index; and wherein "T" is the "chain transfer activity ratio," $T= \{[0.1*\ln(Cs_{narrow\ MWD\ process}/Cs_{broad\ MWD\ process})]+1\}$, and "T" is from 0.4 to 1.6; $MWD_B > MWD_N$; and wherein $Cs_{narrow\ MWD\ process}$ and $Cs_{broad\ MWD\ process}$ are average Cs values of the CTA system at the outlet of the reactor configuration used to produce, respectively, the narrow and the broad MWD polymers, and wherein $MWD_B > MWD_N$; and wherein the ethylene conversion of the polymerization for the broad polymer polymerized is equal to the ethylene conversion of the polymerization for the narrow polymer polymerized.

3. A process to form an ethylene-based polymer, said process comprising polymerizing a mixture comprising ethylene, in the presence of at least one free-radical initiator, and in a tubular reactor system comprising at least two ethylene-based feed streams, and a reactor configuration that comprises at least three reaction zones; and wherein the inlet pressure of the first reaction zone is less than, or equal to, 3200 Bar; and the polymerization has an ethylene conversion >28%, and an m value from 20 mole % to 70 mole %, where m=mol % of ethylene-based feed stream to the first reaction zone, based on the total moles of ethylene-based feed streams fed to the reactor; and wherein the ratio (Y) of a "$MWD_B$ of a broad polymer polymerized", to a narrow "$MWD_N$ polymer polymerized", is as follows: $\{(T)\times(-1.1\times\log(m)+3.0)\}\leq Y\leq \{(T)\times(-6.2\times\log(m)+13.5)\}$; and wherein the "$MWD_B$ polymer" and the "$MWD_N$ polymer" both have the same melt index (I2); and wherein "T" is the "chain transfer activity ratio" and $T=\{[0.1*\ln(Cs_{narrow\ MWD\ process}/Cs_{broad\ MWD\ process})]+1\}$, and "T" is from 0.4 to 1.6; and wherein $Cs_{narrow\ MWD\ process}$ and $Cs_{broad\ MWD\ process}$ are average Cs values of the CTA system at the outlet of the reactor configuration used to produce, respectively, the narrow and the broad MWD polymers, and wherein $MWD_B > MWD_N$; and wherein the ethylene conversion of the polymerization for the broad polymer polymerized is equal to the ethylene conversion of the polymerization for the narrow polymer polymerized; and wherein the inlet pressure of the polymerization for the broad polymer polymerized is equal to the inlet pressure of the polymerization for the narrow polymer polymerized.

4. The process of claim 1, wherein an ethylene-based feed stream is fed to the first reaction zone (1), and to two or more subsequent reaction zones selected from the following: zone n and zone n+1, or zone n+2, where n >1.

5. The process of claim 4, wherein at least two of the following ratios are met:
   a) for reaction zone n, the ratio, RFEn, of "mole fraction of make-up ethylene fed to the first reaction zone (FE1)" to "mole fraction of make-up ethylene fed to reaction zone n (FEn)" is (RFEn=FE1/FEn) is FE1/FEn is >1;
   b) for reaction zone n+1, the ratio, RFEn+1, of "mole fraction of make-up ethylene fed to the first reaction zone (FE1)" to "mole fraction of make-up ethylene fed to reaction zone n+1 (FEn+1)" is (RFEn+1=FE1/FEn+1) is >1;
   c) for reaction zone n+2, the ratio, RFEn+2, of "mole fraction of make-up ethylene fed to the first reaction zone (FE1)" to "mole fraction of make-up ethylene fed to reaction zone n+2 (FEn+2)" is (RFEn+2=FE1/FEn+2) is ≥1; and wherein the "total amount of ethylene fed to the polymerization process" derives from at least one make-up ethylene-based feed stream and at least one recycled ethylene-based feed stream.

6. The process of claim 4, wherein at least two of the following ratios are met:
   a) for reaction zone n, the ratio, RFEn, of "mole fraction of make-up ethylene fed to the first reaction zone (FE1)" to "mole fraction of make-up ethylene fed to reaction zone n (FEn)" is RFEn=FE1/FEn, and 0≤RFEn<1;
   b) for reaction zone n+1, the ratio, RFEn+1, of "mole fraction of make-up ethylene fed to the first reaction zone (FE1)" to "mole fraction of make-up ethylene fed to reaction zone n+1 (FEn+1)" is RFEn+1=FE1/FEn+1, and 0≤RFEn+1<1;
   c) for reaction zone n+2, the ratio, RFEn+2, of "mole fraction of make-up ethylene fed to the first reaction zone (FE1)" to "mole fraction of make-up ethylene fed to reaction zone n+2 (FEn+2)" is RFEn+2=FE1/FEn+2, and 0≤RFEn+2<1; and
   wherein the "total amount of ethylene fed to the polymerization process" derives from at least one make-up ethylene-based feed stream and at least one recycled ethylene-based feed stream.

7. The process of claim 1, wherein the first ethylene-based feed stream comprises at least one CTA, and wherein the activity of the CTA system in the first ethylene-based feed stream is greater than, or equal to, the activity of the CTA system in each subsequent ethylene-based feed stream.

8. The process of claim 1, wherein the first ethylene-based feed stream comprises at least one CTA, and wherein the activity of the CTA system in the first ethylene-based feed stream is less than, the activity of the CTA system in each subsequent ethylene-based feed stream.

9. The process of claim 1, wherein the ethylene-based polymer has a melt-index from 0.1 to 50 g/10 min.

10. The process of claim 1, wherein the ethylene-based polymer has a density from 0.910 to 0.940 g/cc.

* * * * *

UNITED STATES PATENT AND TRADEMARK OFFICE
CERTIFICATE OF CORRECTION

PATENT NO. : 10,774,159 B2
APPLICATION NO. : 16/302830
DATED : September 15, 2020
INVENTOR(S) : Otto J. Berbee et al.

Page 1 of 1

It is certified that error appears in the above-identified patent and that said Letters Patent is hereby corrected as shown below:

In the Claims

Column 32, Line 32, Claim 2:
"an ethylene conversion >28%, and an m value from 20"

Should read:
--an ethylene conversion ≥28%, and an m value from 20--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*